US011790005B2

(12) United States Patent
Sharifi et al.

(10) Patent No.: US 11,790,005 B2
(45) Date of Patent: Oct. 17, 2023

(54) METHODS AND SYSTEMS FOR PRESENTING PRIVACY FRIENDLY QUERY ACTIVITY BASED ON ENVIRONMENTAL SIGNAL(S)

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 106 days.

(21) Appl. No.: 17/107,286

(22) Filed: Nov. 30, 2020

(65) Prior Publication Data

US 2022/0171813 A1 Jun. 2, 2022

(51) Int. Cl.
*G06F 16/903* (2019.01)
*G06F 21/62* (2013.01)

(52) U.S. Cl.
CPC .... *G06F 16/90335* (2019.01); *G06F 21/6245* (2013.01)

(58) Field of Classification Search
CPC .................................................. G06F 21/6245
See application file for complete search history.

(56) References Cited

U.S. PATENT DOCUMENTS

| 2008/0097966 | A1* | 4/2008 | Choi | G06F 16/9537 |
| 2014/0195519 | A1* | 7/2014 | Holt | G06F 16/3322 |
| | | | | 707/722 |
| 2017/0185808 | A1* | 6/2017 | Zhang | G06F 21/84 |
| 2017/0344615 | A1 | 11/2017 | Islam et al. | |
| 2019/0340173 | A1* | 11/2019 | Somaiya | G06F 16/285 |
| 2020/0098358 | A1* | 3/2020 | Rakshit | G06F 16/243 |
| 2020/0356254 | A1* | 11/2020 | Missig | G06F 3/04886 |
| 2022/0148113 | A1* | 5/2022 | Mejia | G06F 40/40 |

OTHER PUBLICATIONS

European Patent Office; Extended European Search Report issued in Application No. 21211472.2, 9 pages, dated Mar. 16, 2022.
European Patent Office; International Search Report and Written Opinion issued in Application No. PCT/US2021/060316; 14 pages; dated Mar. 16, 2022.

* cited by examiner

*Primary Examiner* — Tamara T Kyle
*Assistant Examiner* — Lahcen Ennaji
(74) *Attorney, Agent, or Firm* — Gray Ice Higdon

(57) ABSTRACT

Implementations are directed to receiving a search query from a user, obtaining environmental signal(s) associated with an environment in which the user is located when the search query is received, processing the environmental signal(s) to generate a privacy measure associated with submission of the search query, obtaining additional environmental signal(s) associated with the environment in which the user is located when user input directed to a search interface is received, processing the additional environmental signal(s) to generate an additional privacy measure associated with the user input, selecting, from a superset of historical search queries of the user, a subset of the historical search queries based on at least the privacy measure and the additional privacy measure, and causing the subset of the historical search queries to be presented to the user in response to receiving the user input directed to the search interface.

18 Claims, 9 Drawing Sheets

METHODS AND SYSTEMS FOR PRESENTING PRIVACY FRIENDLY QUERY ACTIVITY BASED ON ENVIRONMENTAL SIGNAL(S)

BACKGROUND

Search queries can be submitted by a user via a variety of client devices, such as smart phones, tablet computers, wearable devices, automobile systems, standalone personal assistant devices, and so forth. Further, the search queries can be submitted using various input modalities (e.g., spoken, touch, and/or typed). Search results that are responsive to the respective search queries can be provided as output at the respective client devices (e.g., visually and/or audibly).

A user can interact with a search interface to submit search queries. Historical search queries that were previously submitted by the user are often presented at the search interface as query suggestions prior to receiving a search query, or presented at the search interface as autocomplete suggestions for a partial query being entered by the user. However, for privacy reasons, the user may desire that some of the historical search queries not be presented at the search interface based on an environment in which the user is located when interacting with the search interface. To ensure privacy, users may selectively enter a private browsing mode or an incognito mode to submit search queries. However, in these modes, historical search queries may never be presented to the user as query suggestions, and the user may need to provide a greater quantity of inputs to re-submit one of the historical search queries.

SUMMARY

Implementations disclosed herein are directed to generating a privacy measure associated with user input received at a client device of a user, and adapting presentation of historical search queries based on the privacy measure. The privacy measure can represent a privacy level of an environment in which the user of the client device is located when the user input directed to a search interface is received. The privacy measure can be determined based on processing one or more environmental signals associated with the environment in which the user of the client device is located when the user input is received. The one or more environmental signals can include, for example, location information that corresponds to a location of the user when the search query is received, audio data that captures environmental noise of the environment when the search query is received, and/or vision data that captures the environment when the search query is received. The privacy measure can additionally or alternatively be determined based on one or more terms of the search query that is received. Further, the privacy measure associated with the user input directed to the search interface can be compared to a plurality of respective privacy measures that are associated with the historical search queries of the user to determine whether the historical search queries should be presented to the user.

For example, assume a user of a client device submits a search query of "Symptoms of Infectious Disease #19" at a search interface of the client device. Further assume that when the user submits the search query, the one or more environmental signals indicate that the user is located at home and no other persons are present in the home. In this example, a privacy measure that indicates the environment in which the user is located when the search query is submitted may be highly private. Additionally, or alternatively, the privacy measure may indicate that the search query may be highly private based on one or more of the terms of the search query including terms related to a medical condition (e.g., a request for symptoms of a disease). Further, assume that the user subsequently commutes to work via train, and user input directed to the search interface of the client device is detected. Further assume that when the user submits the search query, the one or more environmental signals indicate that the user is commuting to work and other persons are present on the train. In this example, an additional privacy measure that indicates the environment in which the user is located when the search query is submitted is public. As a result, a subset of historical search queries that are presented to the user in response to receiving the user input directed to the search interface may exclude the search query of "Symptoms of Infectious Disease #19" and may exclude any other historical search queries that are associated with respective privacy measures that indicate the environment in which the user is located when the historical search queries were submitted may be private.

In various implementations, the one or more environmental signals can be processed using respective machine learning (ML) model(s), and the privacy measure can be generated based on output generated across the ML model(s). For example, in implementations where the one or more environmental signals include location information that corresponds to a location of the user when the search query is received, the location information can be processed using classification model(s) to generate output associated with one or more types of the environment (e.g., a public type environment, a semi-public environment, a private type environment, and/or other types of environments). Additionally or alternatively, in implementations where the one or more environmental signals include audio data that captures environmental noise of the environment when the search query is received, the audio data can be processed using acoustic model(s) to generate output associated with one or more acoustic properties of the environment (e.g., a noise level of the environment, a classification of ambient noise detected in the environment, and/or other acoustic properties of the environment). Additionally or alternatively, in implementations where the one or more environmental signals include vision data that captures the environment when the search query is received, the vision data can be processed using vision model(s) to generate output associated with one or more visual properties of the environment (e.g., an indication of whether additional user(s) are present in the environment, an indication of object(s) that are present in the environment, and/or other visual properties of the environment).

In these implementations, the output generated across the ML model(s) can be processed to generate the privacy measure associated with the submission of the search query. The privacy measure can include, for example, a type of the environment in which the user of the client device is located when the search query is received (e.g., a public environment, a semi-public environment, a private environment, and/or other types of environments), a score or measure representing a likelihood associated with an extent of how private the environment is in which a user of the client device is located when the search query is received (e.g., such as a probability, where a probability closer to 0.0 corresponds to a more public environment and a probability closer to 1.0 corresponds to a more private environment), a binary value representing the privacy level of the environment in which a user of the client device is located when the search query is received (e.g., where a value of 0 corresponds to a public environment and a value of 1 corresponds to a private environment), and/or other representations that are indicative of the privacy level of an environment in which a user of the client device is located when the search query is received. Further, the privacy measure may be based on the output generated across the ML model(s).

For example, in implementations where the output generated across the ML model(s) includes the type of the environment in which the user of the client device is located when the search query is received, assume the location information indicates the user is at home and the audio data does not include any noise, but the vision data indicates that three other persons are present in the environment. In this example, the privacy measure may correspond to a semi-public environment based on the other persons being present in an otherwise private environment. As another example, in implementations where the output generated across the ML model(s) includes the probability representing the privacy level of the environment in which a user of the client device is located when the search query is received, assume the location information indicates the user is at home and the audio data does not include any noise, but the vision data indicates that three other persons are present in the environment. In this example, the privacy measure may correspond to a probability of 0.6 to indicate that the environment is more than likely private (e.g., based on the location information and the audio data), but may not be highly private (e.g., based on the other persons being located in the environment). As yet another example, in implementations where the output generated across the ML model(s) includes the binary value representing the privacy level of the environment in which a user of the client device is located when the search query is received, assume the location information indicates the user is at home and the audio data does not include any noise (e.g., both associated with a binary value representing a private environment), but the vision data indicates that three other persons are present in the environment (e.g., associated with a binary value representing a public environment). In this example, the privacy measure may correspond to the binary value representing the public environment based on the other persons being present in the environment.

In various implementations, when user input directed to a search interface of a client device of a user is subsequently received, respective environmental signals associated with receiving of the user input can be obtained and processed to generate an additional privacy measure associated with receiving of the user input. The additional privacy measure associated with the receiving of the user input can be compared to the privacy measure associated with the submission of the search query to determine whether the additional privacy measure matches the privacy measure. Further, a subset of historical search queries to present to the user can be selected, from among a superset of historical search queries based on whether the additional privacy measure matches the privacy measure (e.g., based on the type of the environments matching and/or based on the additional privacy measure satisfying a privacy level threshold determined based on the privacy level). For example, if the search query was submitted in a private environment (e.g., as indicated by the privacy measure) and the user input is received in a public environment (e.g., as indicated by the additional privacy measure), then the subset of the historical search queries presented to the user may be restricted to those that were also received in public environments, such that the search query is excluded from the subset of historical search queries that are presented to the user. However, in various implementations, if an additional instance of the search query, that was previously received in the private environment, is received in a public environment, the search query may then be subsequently included in the subset of historical search queries that are presented to the user.

In some implementations, the historical search queries that are presented to the user can be presented as query suggestions at the search interface. For example, and assuming the additional privacy measure matches the privacy measure, upon accessing the search interface, the subset of the historical search queries can be presented as query suggestions that, when selected, causes a search engine to execute a search query associated with the selected one of the query suggestions. In some additional or alternative implementations, the historical search queries that are presented to the user can be presented as autocomplete suggestions for a partial query being entered at the search interface. For example, and assuming the additional privacy measure matches the privacy measure, upon entering a partial query of "Sym", the subset of the historical search queries can be utilized to generate an autocomplete query suggestion of "ptoms of Infectious Disease #19" that, when selected, causes a search engine to execute a search query of "Symptoms of Infectious Disease #19".

In various implementations, the user can interact with the superset of the historical search queries. In some implementations, the user may edit privacy measures associated with historical search queries. For example, the user can change a respective privacy measure from being associated with a private environment to being associated with a public environment, such that the respective search query may be included in the subset of the historical search queries presented to the user when it is determined the user is located in a public environment. As another example, the user can change a respective privacy measure from being associated with a public environment to being associated with a private environment, such that the respective search query may be excluded from the subset of the historical search queries presented to the user when it is determined the user is located in a public environment. In some additional or alternative implementations, the user may clear historical search queries from the superset of historical search queries based on the privacy measures associated with historical search queries. For example, the user can specify that historical search queries associated with respective privacy measures associated with a private environment should be removed from the superset of the historical search queries.

By using techniques described herein to adapt presentation of the historical search queries based on the privacy measures, user privacy can be preserved while reducing a quantity of user inputs required to submit an additional instance of a search query that was previously submitted. As a result, both computational and network resources can be conserved. For example, by using the techniques described here to adapt presentation of the historical search queries based on the privacy measures, those historical search queries that are likely to be resubmitted in a current environment of the user can be presented. The user can then select a given one of those historical search queries to be resubmitted without having to retype or provide spoken input that includes the given one of those historical search queries, thereby reducing a quantity of user inputs received and/or processed at the client device.

The above description is provided as an overview of only some implementations disclosed herein. Those implementations, and other implementations, are described in additional detail herein.

DETAILED DESCRIPTION

Figure 1:
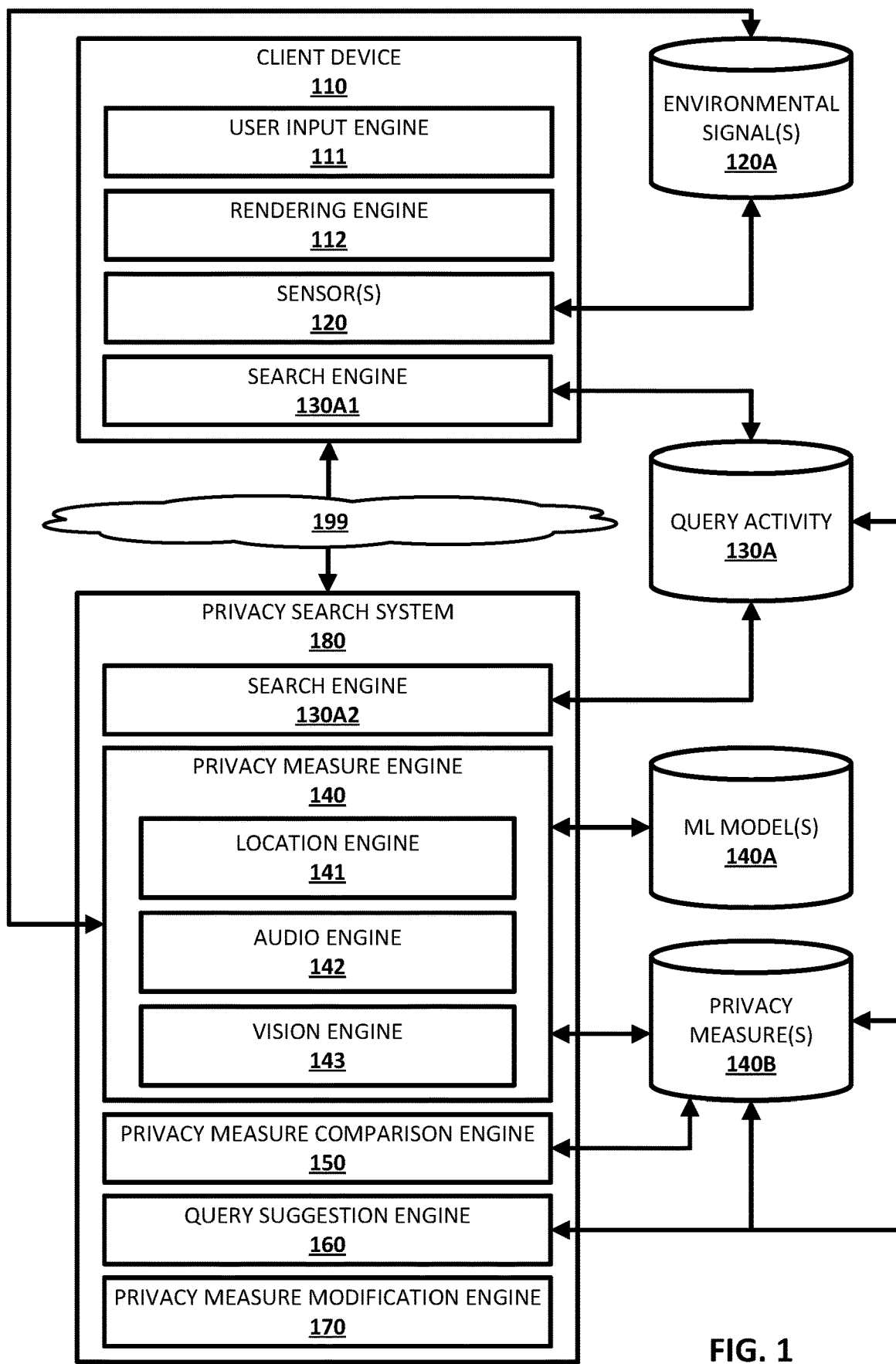
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 111, rendering engine 112, one or more sensors 120, and search engine 130A1.

The user input engine 111 can detect various types of user input at the client device 110. The user input detected at the client device 110 can include spoken input detected via microphone(s) of the client device 110, touch input detected via a user interface input device (e.g., touchscreen) of the client device 110, and/or typed input detected via a user interface input device (e.g., via a virtual keyboard on a touchscreen) of the client device 110. For example, the user input detected via the user input engine 111 can include touch input directed to a search interface, typed input that includes one or more terms of a search query, spoken input that includes one or more terms of a search query, and/or any other input directed to the client device 110 described herein.

In various implementations, when user input is detected at the client device 110 via the user input engine 111, one or more environmental signals generated by one or more of the sensors 120 of the client device 110 can be obtained (and can optionally be stored in environmental signal(s) database 120A in association with the user input). The one or more sensors 120 of the client device can include, for example, GPS sensor(s), microphone(s), vision component(s), and/or other sensors. The one or more environmental signals generated by one or more of the sensors 120 of the client device 110 can include, for example, location information generated by the GPS sensor(s) of the client device 110, audio data generated by the microphone(s) of the client device 110, vision data generated by the vision component(s) of the client device 110, and/or other environmental signals generated by other sensors of the client device 110. The one or more environmental signals can be processed to generate privacy measure(s) associated with the user input that is detected at the client device 110 via the user input engine 111 (e.g., described with respect to privacy measure engine 140).

In various implementations, the user input detected at the client device 110 via the user input engine 111 can be directed to a search interface. The user input directed to the search interface can include, for example, accessing the search interface, entering one or more terms of a search query through one or more of touch input, typed input, or spoken input, and/or interacting with search results that are presented at the search interface. In some implementations, and prior to receiving any terms of a search query, historical search queries previously submitted by a user of the client device 110 can be rendered at the search interface of the client device 110 as query suggestions (e.g., via the rendering engine 112 and as described with respect to query suggestion engine 160). In some additional or alternative implementations, and in response to receiving one or more terms of a search query at the search interface, historical search queries previously submitted by a user of the client device 110 can be utilized to generate autocomplete suggestions for a partial query being entered at the search interface, and can be rendered at the search interface of the client device 110 (e.g., via the rendering engine 112 and as described with respect to query suggestion engine 160).

In some implementations, search queries received at the client device 110 can be processed locally at the client device 110. For example, the client device 110 can locally process search queries directed to database(s) that are local to the client device 110 using search engine 130A1, such as email databases, calendar databases, document databases, notes databases, a contacts database, and/or other databases. In some additional or alternative implementations, search queries received at the client device 110 can be transmitted to a remote system (e.g., server(s)) that is in communication with the client device 110 via one or more networks 199 (e.g., any combination of Wi-Fi, Bluetooth, near-field communication (NFC), local area networks (LANs), wide area networks (WANs), ethernet, the Internet, and/or other networks) to be processed remotely at the remote system. For example, the client device 110 can transmit the search queries to a remote system that processes search queries using search engine 130A2. Any search queries that are received at the client device 110 can be stored in query activity database 130A. The query activity database 130A can include a superset of historical search queries that are received at the client device 110 and/or other client devices associated with a user of the client device.

In various implementations, when user input detected at the client device 110 is directed to a search interface, the client device 110 can utilize privacy search system 180 in determining a subset of historical search queries to present to the user via the client device 110 (e.g., as query suggestions prior to receiving any query terms and/or as autocomplete suggestions for a partial query). The privacy search system 180 is illustrated in FIG. 1, and includes, in various implementations, the search engine 130A2, privacy measure engine 140, privacy measure comparison engine 150, query suggestion engine 160, and privacy measure modification engine 170. The privacy measure engine 140 includes, in various implementations, location engine 141, audio engine 142, and vision engine 143. Although the privacy search system 180 is depicted in FIG. 1 as a remote system in communication with the client device 110 over one or more of the networks, it should be understood that is for the sake of example and is not meant to be limiting. For example, an instance of the privacy search system 180 can be implemented locally at one or more client devices of a user (e.g., the client device 110 and/or additional client devices of the user).

The privacy measure engine 140 can process one or more environmental signals to generate privacy measure(s) associated with the user input that is detected at the client device 110 via the user input engine 111. The privacy measure(s) can represent a privacy level of an environment in which a user of the client device 110 is located when the user input is received. The privacy measure(s) can include, for example, a type of the environment in which the user of the client device 110 is located when the user input is received (e.g., a public environment, a semi-public environment, a private environment, and/or other types of environments), a probability representing the privacy level of the environment in which a user of the client device 110 is located when the user input is received (e.g., where a probability closer to 0.0 corresponds to a more public environment and a probability closer to 1.0 corresponds to a more private environment), a binary value representing the privacy level of the environment in which a user of the client device 110 is located when the user input is received (e.g., where a value of 0 corresponds to a public environment and a value of 1 corresponds to a private environment), and/or other representations that are indicative of the privacy level of an environment in which a user of the client device 110 is located when the user input is received.

In some implementations, the privacy search system 180 can cause the privacy measure engine 140 to process the one or more environmental signals using one or more machine learning (ML) model(s) stored in ML model(s) database 140A. The ML model(s) stored in the ML model(s) database 140 can be trained using, for example, supervised training techniques. For example, the ML model(s) can be trained using a plurality of training instances that each include training instance input and corresponding training instance output. The training instance input can include one or more training environmental signals associated with a training search query, and the corresponding training instance output can include one or more ground truth labels associated with a privacy level for the training search query. Notably, multiple ML model(s) can be trained to process the disparate environmental signals.

In implementations where the one or more environmental signals include the location information generated by the GPS sensor(s) of the client device 110 when the user input is received, the location engine 141 can process the location information, using classification model(s), to generate output associated with one or more types of the environment (e.g., a public type environment, a semi-public environment, a private type environment, and/or other types of environments). For training the classification model(s), the training instance input can each include location information, and the corresponding training instance output can include ground truth label(s) corresponding to a type of environment at a location represented by the location information.

In some implementations, the output generated across the classification model(s) may be a label corresponding to a type of environment that is predicted to correspond to the type of environment the user is located when the user input is received. For example, if the location information corresponds to a residential address of a user of the client device 110, then the output generated across the classification model(s) based on processing the location information may be a "private" label. As another example, if the location information corresponds to a coffee shop, a train station, or other public location, then the output generated across the classification model(s) based on processing the location information may be a "public" label. As yet another example, if the location information corresponds to a residential address of a user other than that of a user of the client device 110, then the output generated across the classification model(s) based on processing the location information may be a "semi-public" label (or "semi-private" label).

In additional or alternative implementations, the output generated across the classification model(s) may be one or more labels corresponding to a type of environment that is predicted to correspond to the type of environment the user is located when the user input is received, and respective measures associated with each of the one or more labels (e.g., binary values, probabilities, log likelihoods, and/or other measures). For example, if the location information corresponds to a residential address of a user of the client device 110, then the output generated across the classification model(s) based on processing the location information may be a "private" label having an associated probability of 0.9 and a "semi-public" label having an associated probability of 0.1, or a "private" label having an associated value of 1.0 and a "semi-public" label and "public" label having associated values of 0.0. As another example, if the location information corresponds to a coffee shop, a train station, or other public location, then the output generated across the classification model(s) based on processing the location information may be a "public" label having an associated probability of 0.7 and a "semi-public" label having an associated probability of 0.3, or a "public" label having an associated value of 1.0 and a "semi-public" label and "private" label having associated values of 0.0. As yet another example, if the location information corresponds to a residential address of a user other than that of a user of the client device 110, then the output generated across the classification model(s) based on processing the location information may be a "semi-public" label (or "semi-private" label) having an associated probability of 0.8 and a "private" label having an associated probability of 0.2, or a "semi-public" label having an associated value of 1.0 and a "public" label and "private" label having associated values of 0.0.

In implementations where the one or more environmental signals additionally or alternatively include the audio data generated by the microphone(s) of the client device 110 when the user input is received, the audio engine 142 can process the audio data, using acoustic model(s), to generate output associated with one or more acoustic properties of the environment (e.g., a noise level of the environment, a classification of ambient noise detected in the environment, and/or other acoustic properties of the environment). For training the acoustic model(s), the training instance input can each include audio data, and the corresponding training instance output can include ground truth label(s) corresponding to a noise level captured in the audio data and/or a type of noise included in the audio data (e.g., people conversing, a vehicle moving, a television show or movie playing in the background, and/or other types of noises).

In some implementations, the output generated across the acoustic model(s) may be a value corresponding to a noise level of the environment in which the user is located when the user input is received (e.g., a decibel level) and/or one or more labels corresponding to types of noises detected in the environment in which the user is located when the user input is received. For example, if the audio data corresponds to audio data captured while a user of the client device 110 is commuting to work via bus, then the output generated across the acoustic model(s) based on processing the audio data may be a "commuting" and/or "bus" label based on the noise generated by the bus, and/or a decibel level detected based on the bus moving (e.g., 90 dB, etc.). As another example, if the audio data corresponds to audio data captured while a user of the client device 110 is in a coffee shop, then the output generated across the acoustic model(s) based on processing the audio data may be a "conversation" label based on other persons conversing at the coffee shop and/or "music" label if there is music playing at the coffee shop, and a decibel level detected based on the people conversing or the music (e.g., 60 dB, 70 dB, etc.). As yet another example, if the audio data corresponds to audio data captured while a user of the client device 110 is at home, then the output generated across the acoustic model(s) based on processing the audio data may be a "television show" or "movie" label based on if either is playing in the background, and a decibel level detected based on the television show or movie (e.g., 40 dB, etc.).

In additional or alternative implementations, the output generated across the acoustic model(s) may be one or more labels corresponding to types of noises detected in the environment in which the user is located when the user input is received, and respective measures associated with each of the one or more labels (e.g., binary values, probabilities, log likelihoods, and/or other measures). For example, if the audio data corresponds to audio data captured while a user of the client device 110 is commuting to work via bus, then the output generated across the acoustic model(s) based on processing the audio data may be a "bus" label having an associated probability of 0.6 and a "car" label having an associated probability of 0.4, or a "bus" label having an associated value of 1.0 and a "car" label having an associated value of 0.0. As another example, if the audio data corresponds to audio data captured while a user of the client device 110 is in a coffee shop, then the output generated across the acoustic model(s) based on processing the audio data may be a "conversation" label having an associated probability or value of 1.0 assuming other persons are conversing at the coffee shop. As yet another example, if the audio data corresponds to audio data captured while a user of the client device 110 is at home, then the output generated across the acoustic model(s) based on processing the audio data may be a "television show" or "movie" label based on if either is playing in the background having an associated probability or value of 1.0.

In implementations where the one or more environmental signals additionally or alternatively include the vision data generated by the vision component(s) of the client device 110 when the user input is received, the vision engine 143 can process the vision data, using vision model(s), to generate output associated with one or more visual properties of the environment (e.g., an indication of whether additional user(s) are present in the environment, an indication of object(s) that are present in the environment, and/or other visual properties of the environment). For training the vision model(s), the training instance input can each include vision data, and the corresponding training instance output can include ground truth label(s) corresponding to whether other persons are present in the environment (and optionally identifies of those persons of visual embeddings of those persons are available) and/or a classification of objects included in the environment (e.g., a coffee table, a train seat, a book shelf, and/or other objects that may present in any environment).

In some implementations, the output generated across the vision model(s) may be one or more labels corresponding to whether other humans are located in the environment when the user input is received (and optionally identities of those other humans) and/or types of objects located in the environment when the user input is received. For example, if the vision data corresponds to vision data captured while a user of the client device 110 is commuting to work via bus, then the output generated across the vision model(s) based on processing the vision data may be a "bus seat" and/or "other persons" label if other persons are present in the environment. As another example, if the vision data corresponds to vision data captured while a user of the client device 110 is in a coffee shop, then the output generated across the vision model(s) based on processing the vision data may be an "other persons" label if other persons are present in the coffee shop and captured in the vision data, and/or a "coffee cup" label if a coffee cup is captured in the vision data, a "table" or "booth" label if a table or booth is captured in the vision data. As yet another example, if the vision data corresponds to vision data captured while a user of the client device 110 is at home, then the output generated across the vision model(s) based on processing the vision data may be a "couch" label if a couch is captured in the vision data, and/or a "spouse" label if a spouse of the user of the client device 110 is captured in the vision data and a visual embedding for the spouse is available.

In additional or alternative implementations, the output generated across the vision model(s) may be one or more labels corresponding to whether other humans are located in the environment when the user input is received (and optionally identities of those other humans) and/or types of objects located in the environment when the user input is received, and respective measures associated with each of the one or more labels (e.g., binary values, probabilities, log likelihoods, and/or other measures). For example, if the vision data corresponds to vision data captured while a user of the client device 110 is commuting to work via bus, then the output generated across the vision model(s) based on processing the audio data may be a "bus seat" label having an associated probability of 0.6 and a "chair" label having an associated probability of 0.4, or a "other persons" label having an associated value of 1.0 if other persons are predicted to be present in the environment based on the vision data. As another example, if the vision data corresponds to vision data captured while a user of the client device 110 is in a coffee shop, then the output generated across the vision model(s) based on processing the vision data may be a "coffee cup" label having an associated probability of 0.6, a "thermos" label having an associated probability of 0.4, or a "coffee cup" label having a value of 1.0. As yet another example, if the vision data corresponds to vision data captured while a user of the client device 110 is at home, then the output generated across the vision model(s) based on processing the audio data may be a "couch" label having an associated probability of 0.8, a "coffee table" label having an associated probability of 0/75, a "other person" label having an associated probability of 0.9 (or "spouse" label having an associated probability of 0.9).

Although the location engine 141, the audio engine 142, and the vision engine 143 are described herein with respect to particular examples having particular labels and associated measures for the labels, it should be understood that is for the sake of example and is not meant to be limiting. For example, other labels exist, and any measure associated with those labels can be utilized. For instance, the labels generated across the ML model(s) may be a function of sounds and/or objects for which the ML model(s) are trained to predict and/or sounds and/or objects that are present in the environment in which the user is located when the user input is received.

The privacy measure engine 140 can process the outputs generated by one or more of the location engine 141, the audio engine 142, or the vision engine 143 to generate a privacy measure associated with the receiving of the user input. The privacy measure engine 140 can process the outputs generated by one or more of the location engine 141, the audio engine 142, or the vision engine 143 using ML model(s) or rule(s) (e.g., ML rule(s) or heuristically defined rule(s)) stored in the ML model(s) database 140A. For training the ML model(s) utilized to process the outputs, the training instance input can each include one or more of the outputs generated by one or more of the location engine 141, the audio engine 142, or the vision engine 143 described above, and the corresponding training instance output can include ground truth privacy measure(s) associated an environment in which user input is received for which the outputs are generated. The privacy measure generated by the privacy measure engine 140 can be stored in the privacy measure(s) database 140B. Further, the privacy measure generated by the privacy measure engine 140 can optionally be stored in association with any subsequent query received at the client device 110 in the privacy measure(s) database 140E3 or mapped to the subsequent query that is stored in the query activity database 130A.

For example, assume that output generated using the location engine 141 indicates that a user of the client device 110 is at a restaurant as indicated by a "public" label having an associated probability of 0.9. Further assume that additional or alternative output generated using the audio engine 142 indicates that other users are present in the environment of the user of the client device 110 as indicated by relatively high noise level (e.g., 80 dB) and a "conversation" label having an associated probability of 0.8. Further assume that additional or alternative output generated using the vision engine 143 indicates that other users are present in the environment of the user of the client device 110 as indicated by an "other persons" label also having an associated probability of 0.8. In this example, the privacy measure engine 140 can process these outputs, using the ML model(s) or rule(s), to generate a privacy measure of 0.75 associated with a label of "public" and/or a privacy measure of 0.25 associated with a label of "private" based on processing these outputs from one or more of the location engine 141, the audio engine 142, or the vision engine 143. In other words, the privacy measure associated with the receiving of the user input in this example that is generated based on these outputs indicate that the user is located in a public environment, and any search queries submitted by the user of the client device 110 in this environment are not likely to be considered highly private by the user. Accordingly, and as described below with respect to the privacy measure comparison engine and the query suggestion engine 160, historical search queries that are associated with privacy measures that are indicative of being received in an environment more private than the environment in which the user is located when the user input is received may not be presented to the user as query suggestions and/or autocomplete suggestions for a partial query.

As another example, assume that output generated using the location engine 141 indicates that a user of the client device 110 is at a home as indicated by a "private" label having an associated probability of 1.0. Further assume that additional or alternative output generated using the audio engine 142 indicates that no other persons are present in the environment as indicated by a relatively small sound level (e.g., 20 dB) and no other noise being detected. Further assume that additional or alternative output generated using the vision engine 143 indicates that no other users are present in the environment of the user of the client device 110 (e.g., the user of the client device 110 is alone). In this example, the privacy measure engine 140 can process these outputs, using the ML model(s) or rule(s), to generate a privacy measure of 0.95 associated with a label of "private" and/or a privacy measure of 0.05 associated with a label of "public". In other words, the privacy measure associated with the receiving of the user input in this example that is generated based on these outputs indicate that the user is located in a private environment, and any search queries submitted by the user of the client device 110 in this environment may be considered highly private by the user. Accordingly, and as described below with respect to the privacy measure comparison engine and the query suggestion engine 160, any historical search query may be presented to the user as query suggestions and/or autocomplete suggestions for a partial query regardless of the environment in which it was received (e.g., public environment, semi-public environment, or private environment).

The privacy measure comparison engine 150 can compare the privacy measure associated with the user input with a plurality of additional privacy measures associated with historical search queries that are stored in the privacy measure(s) database 140B. Based on comparing the privacy measure with the plurality of additional privacy measures, the privacy measure comparison engine 150 can determine whether the privacy measures match any of the plurality of additional privacy measures. In implementations where the privacy measure corresponds to a label (e.g., public, semi-public, private, and/or any other label that are optionally defined with varying degrees of granularity, such as highly public, moderately public, highly private, moderately private, and so on), the privacy measure comparison engine 150 can identify those additional privacy measures that match the privacy measure, and the historical search queries associated with those additional privacy measures. For example, assume the privacy measure corresponds to a label of private. In this example, the privacy measure comparison engine 150 can identify those additional privacy measures having any label, and the historical search queries associated therewith, since the privacy measure is indicative of a private environment and the user of the client device 110 may submit any search query regardless of the environment in which it was originally submitted. As another example, assume the privacy measure corresponds to a label of public. In this example, the privacy measure comparison engine 150 can identify limit those additional privacy measures to the ones having a public label, and the historical search queries associated therewith, since the privacy measure is indicative of a public environment and the user of the client device 110 may only submit search query that were previously submitted in a public environment.

In implementations where the privacy measure corresponds to an associated value (e.g., probability, log likelihood, binary value, etc.), the privacy measure comparison engine 150 can identify those additional privacy measures that have associated values satisfying a threshold privacy measure level determined based on the privacy measure associated with the user input. For example, assume the privacy measure corresponds to a probability of 0.35 associated with the label private (and an implied probability of 0.65 associated with the label public). In this example, the threshold privacy measure level can be a private threshold level of 0.35 or a public threshold level of 0.65. The privacy measure comparison engine 150 can identify those additional privacy measures associated with probabilities below 0.35 for the private threshold level or above the probability of 0.65 for the public threshold level as satisfying the threshold privacy measure level. Further, the privacy measure comparison engine 150 can identify the historical search queries associated with those privacy measures that satisfy the threshold privacy measure level. As a result, the identified historical search queries, in this example, include those that were submitted in similar or more public environments that the user of the client device 110 may not consider private. As another example, assume the privacy measure corresponds to a probability of 0.95 associated with the label private (and an implied probability of 0.05 associated with the label public). In this example, the threshold privacy measure level can be a private threshold level of 0.95 or a public threshold level of 0.05. The privacy measure comparison engine 150 can identify those additional privacy measures associated with probabilities below 0.95 for the private threshold level or above the probability of 0.05 for the public threshold level as satisfying the threshold privacy measure level. Further, the privacy measure comparison engine 150 can identify the historical search queries associated with those privacy measures that satisfy the threshold privacy measure level. As a result, the identified historical search queries, in this example, include those that were submitted in similar or more public environments that the user of the client device 110 may consider private.

The query suggestion engine 160 can utilize the historical search queries that are associated with the additional privacy measures identified by the privacy measure comparison engine 150 to generate query suggestions and/or autocomplete query suggestions for a partial query being entered at the search interface of the client device 110. The query suggestions and/or autocomplete query suggestions can be visually presented to the user via a display of the client device 110 and/or audibly presented to the user via speaker(s) of the client device 110 (e.g., using the rendering engine 112). In some implementations, the query suggestion engine 160 can select a subset of the historical search queries, from among a superset of the identified historical search queries, to be presented to the user of the client device 110 as query suggestions. The query suggestions can be presented at the search interface of the client device 110 prior to the user entering any terms of a search query and/or while the user is entering terms of a search query. For example, the subset of the historical search queries may select a predefined number of historical search queries to present to the user (e.g., three, four, six, and/or any other number), and can optionally present a selectable element that, when selected, presents additional historical search queries to the user via the search interface or additional subsets of the historical search queries to the user via the search interface. In some versions of those implementations, the subset of the historical search queries can optionally be presented along with other query suggestions, such as popular or trending search queries that are popular or trending among a plurality of users (and optionally limited to users in the same country, region, or city as the user of the client device 110). In some additional or alternative implementations, the historical search queries can be utilized to generate autocomplete suggestions for a partial query being entered at the search interface of the client device 110. For example, assume a user previously submitted a search query "Symptoms of Infectious Disease #19". Further assume that the user has entered a partial query of "Sym" at the search interface of the client device 110. In this example, the query suggestion engine 160 can cause autocomplete suggestions of "ptoms of Infectious Disease #19", "phony Tickets", and the like to be presented to the user at the search interface of the client device 110. Providing the query suggestions based on the privacy measure and the additional privacy measure(s) is described below (e.g., with respect to FIGS. 4A-4C and 5A-5B). Notably, the historical search queries presented to the user may be restricted to those that are associated with additional privacy measure(s) that match a privacy measure associated with receiving of the user input.

In some implementations, the privacy measure modification engine 170 can modify previously generated privacy measure(s) for historical search query(ies) based on one or more environmental signals obtained when additional instance(s) of the historical search query(ies) are received at the client device 110. For example, assume a search query of "Score of the Louisville game" has been previously received five times. Further assume that a user of the client device 110 was at home alone each time this search query was previously submitted such that the search query is associated with a privacy measure indicating that the search query is private. As a result, the search query of "Score of the Louisville game" may be excluded from a subset of historical search queries that are presented to the user. However, further assume an additional instance of the search query of "Score of the Louisville game" is received when the user of the client device 110 is at a noisy bar. The resulting privacy measure generated based on the one or more environmental signals obtained when the additional instance of the search query was received indicates that the search query is not private, and the privacy measure associated with the search query can be updated in the privacy measure(s) database 140B. As a result, the search query of "Score of the Louisville game" may be subsequently included in a subset of historical search queries that are presented to the user.

Although the client device 110 and the privacy search system 180 are described herein as including particular engines, such as those depicted in FIG. 1, it should be understood that the client device 110 and/or the privacy search system 180 may include additional or alternative engines. For example, the client device 110 and/or the privacy search system 180 can include speech recognition engine(s), natural language understanding (NLU) engine(s), speech synthesis engine(s), and/or other engine(s). For instance, the speech recognition engine(s) can process, using speech recognition model(s), audio data that captures spoken input of a user of the client device 110 to generate recognized text corresponding to the spoken input, the NLU engine(s) can process, using NLU model(s), the recognized text generated by the speech recognition engine(s) to determine intent(s) included in the spoken input, and the speech synthesis engine(s) can generate, using speech synthesis model(s), synthesized speech audio data that includes synthesized speech to be rendered via speaker(s) of the client device 110 (e.g., using the rendering engine 112) that is responsive to the spoken input and/or any other input received at the client device 110. Further, the client device 110 and/or the privacy search system 180 may additionally or alternatively include instance(s) of an automated assistant that can engage in a human-to-computer dialog with a user of the client device 110.

In implementations where the client device 110 and/or the privacy search system 180 include NLU engine(s), an intent determined by the NLU engine(s) (e.g., based on term(s) of the search query typed by the user and/or based on recognized term(s) of the search query included in spoken input) can be processed, using classification model(s), to generate output associated with one or more types of search queries. The one or more types of the search queries can be defined with varying levels of granularity, and can include, for example, medical search queries, sports search queries, travel search queries, restaurant search queries, and/or any other classification of search queries. Further, each of the one or more types of queries can be mapped to one or more types of the environment. For example, any medical search query may be mapped to a private environment since a user of the client device 110 likely considers medical search queries private, whereas any sports search query, travel search query, and restaurant search query may be mapped to a private environment since the user of the client device 110 likely does not consider these search queries private. The privacy measure engine 140 can, in addition to or in lieu of one or more of the environmental signals, consider one or more of the types of the search query into which the search query is classified in generating the privacy measure.

For example, assume the privacy measure engine 140 generates a privacy measure for a given search query that indicates the user may not consider the search query to be a private query based on the one or more environmental signals (e.g., the search query is received while the user of the client device 110 is commuting to work via train). However, if the search query is a type of query that is considered private (e.g., a medical search query), then the privacy measure engine 140 may generate a privacy measure associated with submission of the search query that indicates the user of the client device 110 considers the search query private because it is the type of query that is generally considered private. In contrast, assume the privacy measure engine 140 generates a privacy measure for a given search query that indicates the user may consider the search query to be a private query based on the one or more environmental signals (e.g., the search query is received while the user is at home alone). However, if the search query is a type of query that is considered public (e.g., a sports query), then the privacy measure engine 140 may generate a privacy measure associated with submission of the search query that indicates the user of the client device 110 does not consider the search query private because it is the type of query that is generally considered public.

Moreover, although FIG. 1 is described with respect to a single client device, it should be understood that is for the sake of example and is not meant to be limiting. For example, one or more additional client devices of a user can also be in communication with the privacy search system 180 over one or more of the networks 199 (or implement an additional instance of the privacy search system 180) and/or in communication with the client device 110 over one or more of the networks 199. For example, an initial search query may be received and processed at the client device 110, but the user input directed to the search interface may be received at one or more of that additional client devices of the user, and the privacy search system 180 can be utilized to restrict the subset of the historical search queries that are presented at one or more of the additional client devices of the user.

By using techniques described herein to adapt presentation of the historical search queries based on the privacy measures, user privacy can be preserved while reducing a quantity of user inputs required to submit an additional instance of a search query that was previously submitted. As a result, both computational and network resources can be conserved. For example, by using the techniques described here to adapt presentation of the historical search queries based on the privacy measures, those historical search queries that are likely to be resubmitted in a current environment of the user can be presented. The user can then select a given one of those historical search queries to be resubmitted without having to retype or provide spoken input that includes the given one of those historical search queries, thereby reducing a quantity of user inputs received and/or processed at the client device.

Figure 2:
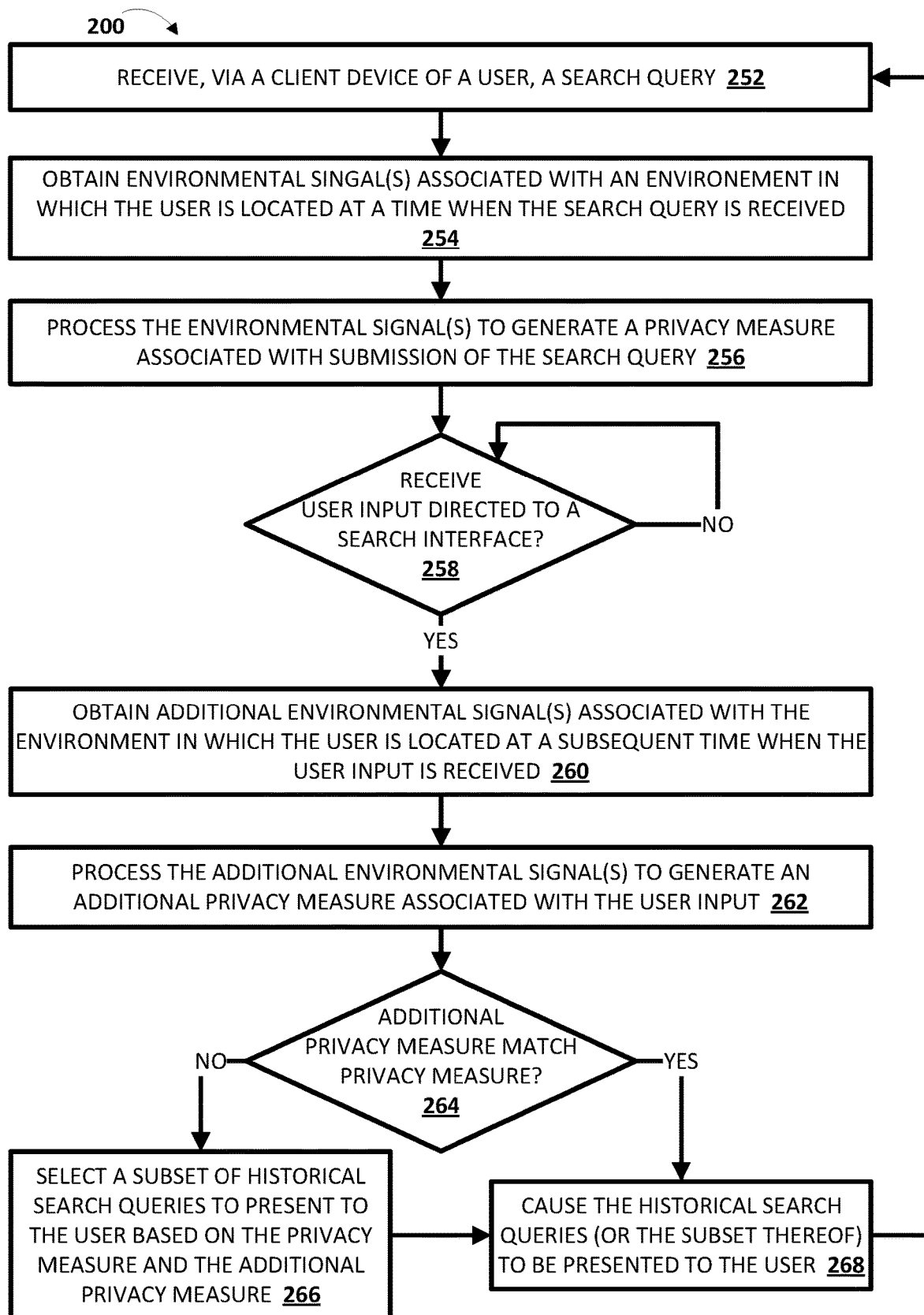
FIG. 2 depicts a flowchart illustrating an example method of generating a privacy measure associated with submission of a search query and providing a subset of historical search queries based on the generated privacy measure, in accordance with various implementations.

Turning now to FIG. 2, a flowchart illustrating an example method 200 of generating a privacy measure associated with submission of a search query and providing a subset of historical search queries based on the generated privacy measure is depicted. For convenience, the operations of the method 200 are described with reference to a system that performs the operations. This system of the method 200 includes one or more processors and/or other component(s) of computing device(s) (e.g., client device 110 of FIGS. 1, 4A-4C, 5A-5B, and/or computing device 610 of FIG. 6, one or more servers, and/or other computing devices). Moreover, while operations of the method 200 are shown in a particular order, this is not meant to be limiting. One or more operations may be reordered, omitted, and/or added.

At block 252, the system receives, via a client device of a user, a search query. The search query can be received at a search interface of the client device using one or more of typed, touch, or spoken input. The search interface can be displayed via a graphical user interface of the client device. In some implementations, the search interface may be associated with a software application accessible at the client device, such as a browser-based application, an automated assistant application, a contacts application, a navigation application, a calendar application, an email application, a task or reminders application, and/or any other application accessible at the client device that includes search functionality. In some additional or alternative applications, the search interface can be a web-browser, a home screen of a mobile device, and/or any other interface capable of receiving search queries.

At block 254, the system obtains one or more environmental signals associated with an environment in which the user is located at a time when the search query is received. The one or more environmental signals associated with the environment can be generated by sensor(s) of the client device, and can include, for example, one or more of location information generated by GPS sensor(s) of the client device, audio data generated by microphone(s) of the client device, vision data generated by vision component(s) of the client device, and/or other environmental signals that can be captured by the sensor(s) of the client device. The one or more environmental signals can be captured within a threshold range of time with respect to the time the search query is received (e.g., several seconds, milliseconds, and/or other durations of times prior to receiving the search query and subsequent to receiving the search query).

At block 256, the system processes the one or more environmental signals to generate a privacy measure associated with submission of the search query. The system can process, using ML model(s), the one or more environmental signals to generate output(s), and can generate the privacy measure based on the output(s) generated across the ML model(s). In implementations where the one or more environmental signals include the location information of the environment in which the user is located at the time when the search query is received, the system can process the location information using classification model(s) to generate output(s) (e.g., as described with respect to the location engine 141 of FIG. 1). In additional or alternative implementations where the one or more environmental signals include the audio data capturing noise in the environment in which the user is located at the time when the search query is received, the system can process the audio data using acoustic model(s) to generate output(s) (e.g., as described with respect to the acoustic engine 142 of FIG. 1). In additional or alternative implementations where the one or more environmental signals include the vision data capturing the environment in which the user is located at the time when the search query is received, the system can process the vision data using vision model(s) to generate output(s) (e.g., as described with respect to the vision engine 143 of FIG. 1). Further the system can process one or more of these outputs using additional ML model(s) to generate the privacy measure.

At block 258, the system determines whether user input directed to a search interface of the client device or an additional client device of the user is received. The user input can be, for example, one or more of typed, touch, or spoken input directed to the search interface. For example, the user input directed to the search interface can include accessing the search interface, entering a partial query into a search field of the search interface, submitting a query by the search field of the search interface, invoking an automated assistant (e.g., by a squeeze of the client device or the additional client device, by speaking a particular word or phrase, and/or by other means of invoking the automated assistant) without receiving any additional user input (and optionally after a duration of time without receiving any additional user input), and/or other user interactions with the search interface. If, at an iteration of block 258, the system determines user input directed to the search interface is not received, the system continues monitoring for the user input at block 258. If, at an iteration of block 258, the system determines user input directed to the search interface is received, the system proceeds to block 260.

At block 260, the system obtains one or more additional environmental signals associated with the environment in which the user is located at a subsequent time when the user input is received. The subsequent time when the user input is received at block 258 being subsequent to the time when the search query is received at block 252. Notably, the environment in which the user is located at the subsequent time when the user input is received at block 258 may be the same environment in which the search query is received at block 252, or a different environment. The one or more additional environmental signals associated with the environment can be generated by sensor(s) of the client device or the additional client device, and can include the environmental signals described above with respect to block 254.

At block 262, the system processes the one or more additional environmental signals to generate an additional privacy measure associated with the user input. The system can process the one or more additional environmental signals to generate the additional privacy measure associated with the user input in the same or similar manner described above with respect to block 256.

At block 264, the system determines whether the additional privacy measure associated with the user input that is generated at block 262 matches the privacy measure associated with the submission of the search query that is generated at block 256 (e.g., described with respect to the privacy measure comparison engine 150 of FIG. 1). In some implementations, the privacy measure and the additional privacy measure can be labels corresponding to one or more disparate types of environments (e.g., a public environment, a semi-public environment, a private environment, and/or other types of environments defined with varying degrees of granularity). In some versions of those implementations, determining whether the additional privacy measure matches the privacy measure may be based on the labels. In some additional or alternative implementations, the privacy measure and the additional privacy measure can be probabilities, log likelihoods, binary values, and/or other values representing an extent of how private or how public the environment is in which the search query and the user input are received, respectively. In some versions of those implementations, determining whether the additional privacy measure matches the privacy measure may be based on the values.

If, at an iteration of block 264, the system determines the additional privacy measure does not match the privacy measure, the system proceeds to block 266. For example, in implementations where the privacy measure and the additional privacy measure are labels corresponding to the one or more disparate types of environments, assume the privacy level associated with the submission of the search query received at block 252 corresponds to a private label, and assume the additional privacy level associated with the user input received at block 258 corresponds to a public label. In this example, the system may determine that the additional privacy measure does not match the privacy measure since the user input is received in an environment that is not as private as the environment in which the search query is received. As another example, in implementations where the privacy measure and the additional privacy measure are values representing an extent of how private or how public the environment is in which the search query and the user input are received, assume the privacy level associated with the submission of the search query received at block 252 corresponds to a probability of 0.8 (e.g., indicative of a more private environment), and assume the additional privacy level associated with the user input received at block 258 corresponds to a probability of 0.4 (e.g., indicative of a less private environment). In this example, the system may determine that the probability of 0.4 does not match or exceed the probability of 0.8, which indicates that an environment in which the user input is received is not as private as the environment in which the search query is received.

At block 266, the system selects, from among a superset of historical search queries, a subset of historical search queries to present to the user based on the privacy measure associated with the submission of the search query that is generated at block 256 and the additional privacy measure associated with the user input that is generated at block 262. The superset of historical search queries can be stored in one or more databases or memory(ies) accessible by the client device and/or the additional client device. Further, the subset of the historical search queries that are selected from the superset may be restricted to those associated with privacy measure(s) that match the privacy measure associated with the submission of the search query that was generated at block 256. Notably, the subset of the historical search queries excludes the search query received at block 252 since the additional privacy measure does not match the privacy measure. The system then proceeds to block 268. Block 268 is described below.

If, at an iteration of block 264, the system determines the additional privacy measure does match the privacy measure, the system proceeds to block 268. For example, in implementations where the privacy measure and the additional privacy measure are labels corresponding to the one or more disparate types of environments, assume the privacy level associated with the submission of the search query received at block 252 corresponds to a public label, and assume the additional privacy level associated with the user input received at block 258 corresponds to a private label. In this example, the system may determine that the additional privacy measure matches the privacy measure since the user input is received in an environment that is more private (or at least as private) as the environment in which the search query is received. As another example, in implementations where the privacy measure and the additional privacy measure are values representing an extent of how private or how public the environment is in which the search query and the user input are received, assume the privacy level associated with the submission of the search query received at block 252 corresponds to a probability of 0.4 (e.g., indicative of a more private environment), and assume the additional privacy level associated with the user input received at block 258 corresponds to a probability of 0.6 (e.g., indicative of a more private environment). In this example, the system may determine that the probability of 0.6 matches or exceeds the probability of 0.4, which indicates that an environment in which the user input is received is more private (or at least as private) as the environment in which the search query is received. The system then proceeds to block 268.

At block 268, the system causes the historical search queries (or the subset thereof that is selected at block 266), to be presented to the user. The historical search queries (or the subset thereof that is selected at block 266) can be presented to the user via the client device or the additional client based on where the user input is received at block 264. The historical search queries (or subset thereof) can be presented to the user prior to receiving any terms of an additional search query at the search interface, while terms of an additional search query are being entered at the search interface, and/or while search results responsive to an additional search query are being displayed at the search interface. In some implementations, the historical search queries (or the subset thereof) can be presented to the user as query suggestions at the search interface. In some additional or alternative implementations, the historical search queries (or the subset thereof) can be utilized to generate autocomplete suggestions for a partial query being entered at the search interface. Presenting the historical search queries (or the subset thereof) is described below (e.g., with respect to FIGS. 4A-4C and 5A-5B).

Figure 3:
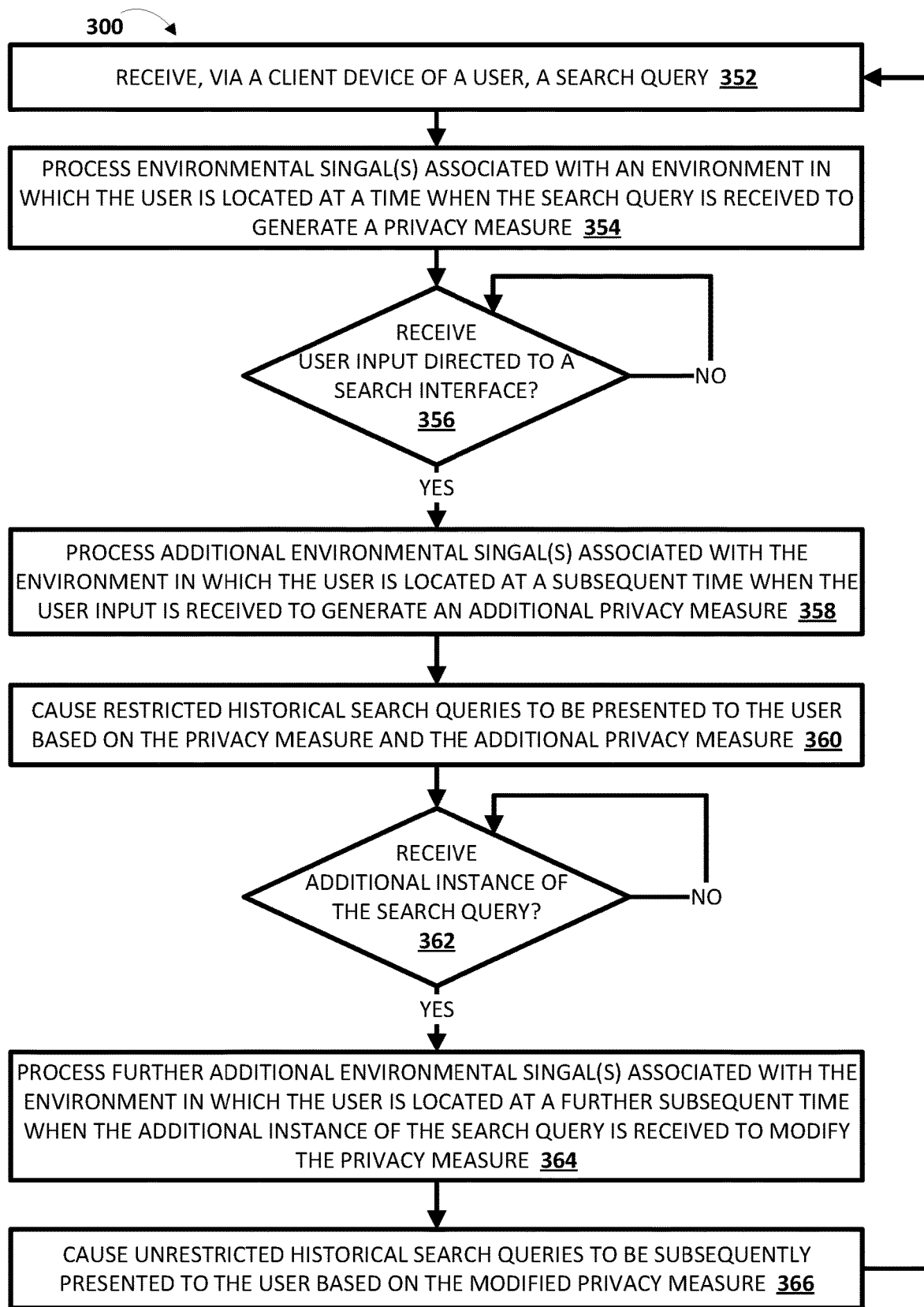
FIG. 3 depicts a flowchart illustrating an example method of modifying a privacy measure associated with submission of a search query and providing a subset of historical search queries based on the modified privacy measure, in accordance with various implementations.

Turning now to FIG. 3, a flowchart illustrating an example method 300 of modifying a privacy measure associated with submission of a search query and providing a subset of historical search queries based on the modified privacy measure is depicted. For convenience, the operations of the method 300 are described with reference to a system that performs the operations. This system of the method 300 includes one or more processors and/or other component(s) of computing device(s) (e.g., client device 110 of FIGS. 1, 4A-4C, 5A-5B, and/or computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system receives, via a client device of a user, a search query. The search query can be received at a search interface of the client device in the same or similar manner described above with respect to block 252 of FIG. 2.

At block 354, the system processes one or more environmental signals associated with an environment in which the user is located at a time when the search query is received to generate a privacy measure. The one or more environmental signals can be obtained in the same or similar manner described with respect to block 254 of FIG. 2, and processed in the same or similar manner described with respect to block 256 of FIG. 2 to generate the privacy measure.

At block 356, the system determines whether user input directed to a search interface of the client device or an additional client device of the user is received. The system can determine whether user input directed to a search interface is received at the client device or the additional client device in the same or similar manner described with respect to block 258 of FIG. 2. If, at an iteration of block 356, the system determines user input directed to the search interface is not received, the system continues monitoring for the user input at block 356. If, at an iteration of block 356, the system determines user input directed to the search interface is received, the system proceeds to block 358.

At block 358, the system processes one or more additional environmental signals associated with the environment in which the user is located at a subsequent time when the user input is received to generate an additional privacy measure. The additional privacy measure generated at block 358 is associated with the receiving of the user input at block 356. The one or more additional environmental signals can be obtained in the same or similar manner described with respect to block 260 of FIG. 2, and processed in the same or similar manner described with respect to block 262 of FIG. 2 to generate the additional privacy measure.

At block 360, the system causes restricted historical search queries to be presented to the user based on the privacy measure associated with the submission of the search query that is generated at block 354 and the additional privacy measure associated with the user input that is generated at block 358. Notably, the restricted historical search queries exclude the search query. For example, assume that the additional privacy measure does not match the privacy measure (e.g., determined in the same or similar manner described above with respect to block 264 of FIG. 2), and assume a subset of historical search queries is selected, from among a superset of the historical search, for presentation to the user, where the subset of the historical search queries excludes the search received at block 352 (e.g., selected in the same or similar manner described above with respect to block 266 of FIG. 2). In this example, the subset of the historical search results that excludes the search query may be considered the restricted historical search queries. Further, the restricted historical search queries can be presented to the user in the same or similar manner described with respect to block 268 of FIG. 2.

At block 362, the system determines whether an additional instance of the search query received at block 352 is received at the client device or the additional client device. The additional search query can be received at a search interface of the client device in the same or similar manner described above with respect to block 252 of FIG. 2. If, at an iteration of block 362, the system determines an additional instance of the search query is not received, the system continues monitoring for the additional instance of the search query at block 362. If, at an iteration of block 362, the system determines an additional instance of the search query is received, the system proceeds to block 364.

At block 364, the system processes one or more further additional environmental signals associated with the environment in which the user is located at a further subsequent time when the additional instance of the search query is received to modify the privacy measure. The one or more further additional environmental signals can be obtained in the same or similar manner described with respect to block 260 of FIG. 2, and processed in the same or similar manner described with respect to block 262 of FIG. 2 to generate a further additional privacy measure associated with submission of the search query. The privacy measure generated at block 354 can then be modified based on the further additional privacy measure. For example, assume that the further additional privacy measure indicates the additional instance of the search query received at block 362 was received in a public environment, but the privacy measures indicated the original instance of the search query received at block 352 was received in a private environment. In this example, the privacy measure can be modified from being associated with a private environment to being associated with a public environment since it can be inferred that the user may not regard the search query as private since it was submitted in a public environment.

At block 366, the system causes unrestricted historical search queries to be subsequently presented to the user based on the modified privacy measure. Notably, the unrestricted historical search queries may include the search query. For example, assume additional user input directed to the search interface is received, and the user is present in a public environment as indicated by a yet further additional privacy measure. In this example, the search query may be included in the subset of the historical search queries presented to the user based on the modified privacy measure associated with submission of the search query.

Figure 4A:
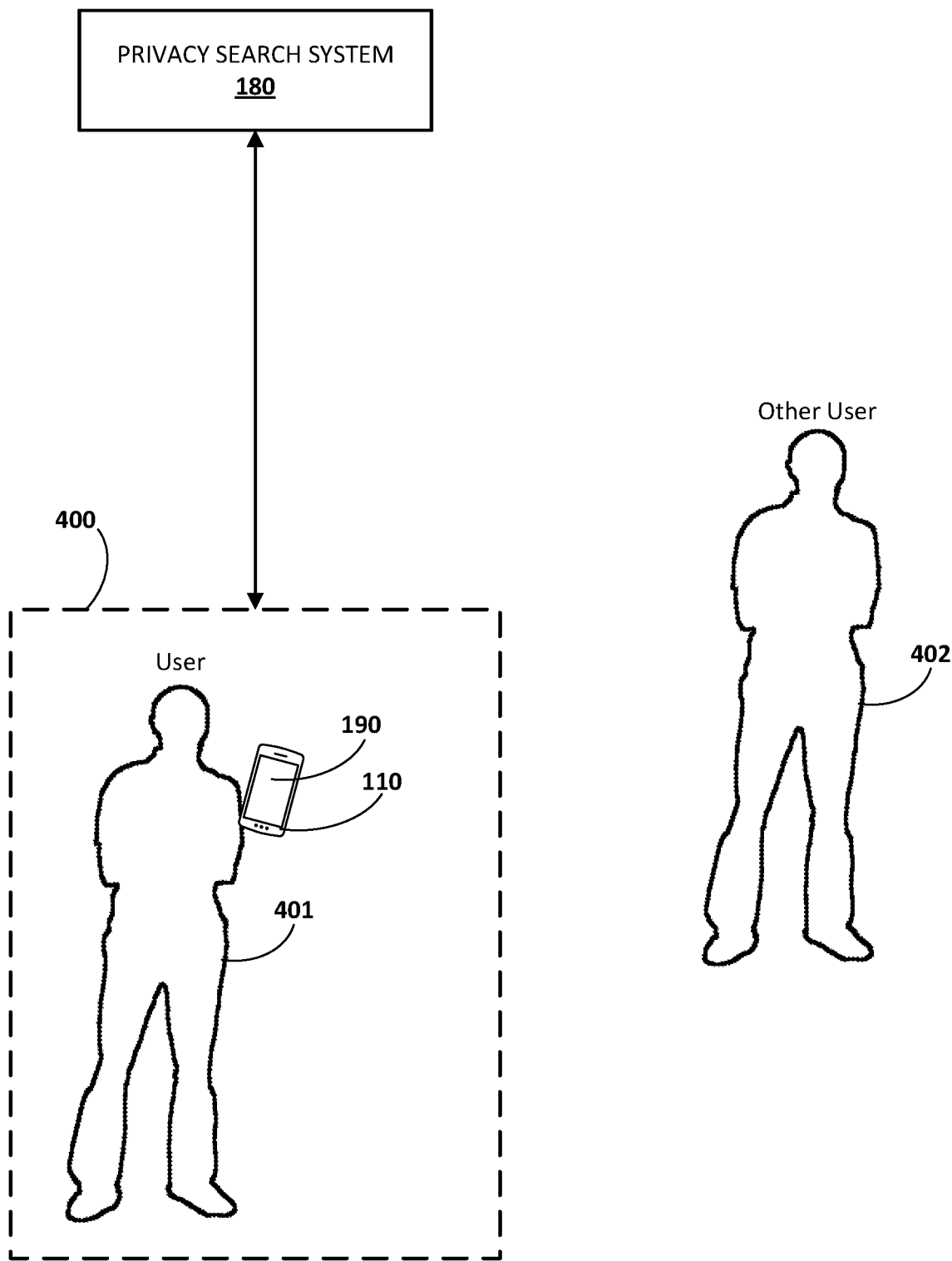
FIGS. 4A, 4B, and 4C depict various non-limiting examples of user interfaces associated with generating a privacy measure associated with submission of a search query in a private environment and providing a subset of historical search queries based on the generated privacy measure, in accordance with various implementations.
Figure 4B:
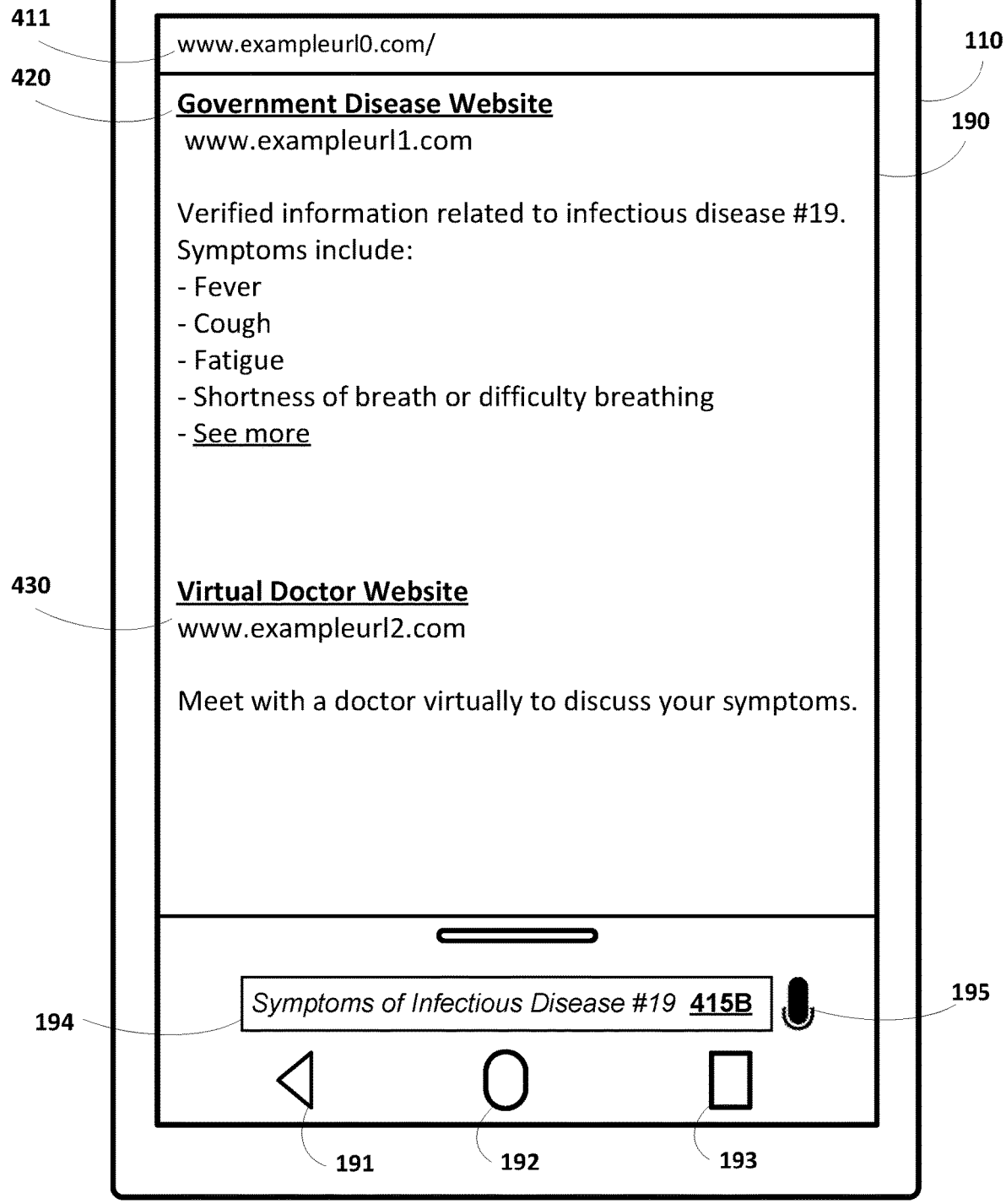
Figure 4C:
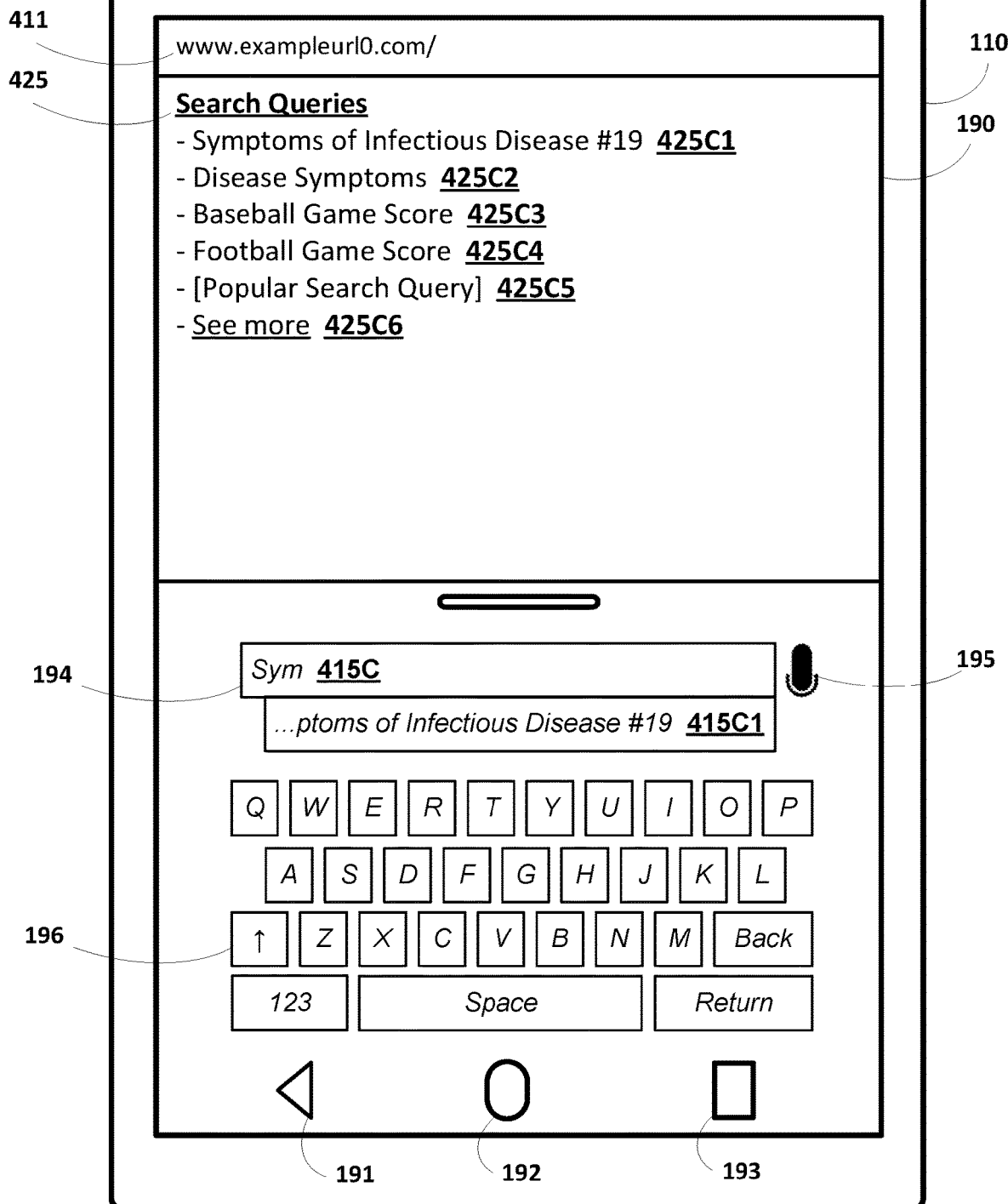

Turning now to FIGS. 4A-4C and 5A-B, various non-limiting examples of user interfaces associated with generating privacy measures associated with user input directed to a search interface in various environments and providing different subsets of historical search queries based on the generated privacy measures are depicted. FIGS. 4A-4C each depict the client device 110 having a graphical user interface 190, and may include one or more of the components of the client device of FIG. 1. One or more aspects of a privacy search system (e.g., privacy search system 180 of FIG. 1) may be implemented locally at the client device 110 and/or at remote computing device(s) (e.g., server(s)) that are in network communication with the client device 110 (e.g., via network(s) 199 of FIG. 1). However, for the sake of simplicity, operations of FIGS. 4A-4C are described herein as being performed by the client device 110. Although the client device 110 of FIGS. 4A-4C is depicted as a mobile phone, it should be understood that is not meant to be limiting. The client device 110 can be, for example, a standalone assistant device (e.g., having microphone(s), speaker(s), and/or a display), a laptop, a desktop computer, a vehicular computing device, and/or any other client device capable of receiving search queries, processing search queries, and/or displaying historical search queries.

The graphical user interface 190 of FIGS. 4A-4C further includes a textual reply interface element 194 that the user may select to generate user input via a virtual keyboard 196 (as shown in FIG. 4C) or other touch and/or typed input, and a voice reply interface element 195 that the user may select to generate user input via microphone(s) of the client device 110. In some implementations, the user may generate user input via the microphone(s) without selection of the voice reply interface element 195. For example, active monitoring for audible user input via the microphone(s) may occur to obviate the need for the user to select the voice reply interface element 195. In some of those and/or in other implementations, the voice reply interface element 195 may be omitted. Moreover, in some implementations, the textual reply interface element 194 may additionally and/or alternatively be omitted (e.g., the user may only provide audible user input). The graphical user interface 190 of FIGS. 4A-4C also includes system interface elements 191, 192, 193 that may be interacted with by the user to cause the computing device 110 to perform one or more actions.

In various implementations, user input directed to a search interface displayed on the graphical user interface 190 can be received from a user 401 of the client device 110. The client device 110 can utilize the privacy search system 180 to process one or more environmental signals to generate a privacy measure associated with an environment 400 in which the user 401 is located when the user input is received. As shown in FIG. 4A, assume the user 401 is the only user present in the environment 400 as indicated by other user 402 being located outside of the environment 400 (e.g., outside the dashed box). Further assume, and as shown in FIG. 4B, the user input directed to the search interface (e.g., a browser-based software application accessible by the client device 110 as indicated by URL 411 of "www.exampleurl0.com/") includes the user 401 submitting a search query 415B of "Symptoms of Infectious Disease #19". Search results that are responsive to the search query can be presented to the user 401, and can include, for example, a first search result 420 of "Government Disease Website", and a second search result 430 of "Virtual Doctor Website".

In the example shown in FIGS. 4A and 4B, assume sensor(s) of the client device 110 capture one or more environmental signals of the environment 400 in which the user 401 is located when the search query 415B is received. The one or more environmental signals can include, for example, location information that corresponds to a location of the user 401 when the search query 415B is received and that is generated using GPS sensor(s) of the client device 110, audio data that captures environmental noise of the environment 400 when the search query 415B is received and that is generated using microphone(s) of the client device 110, and/or vision data that captures the environment 400 when the search query 415B is received and that is generated using microphone(s) of the client device 110. Further the one or more environmental signals can be processed using ML model(s) (e.g., stored in the ML model(s) database 140A of FIG. 1), to generate output(s), and the privacy measure associated with submission of the search query 415B can be generated based on the output(s) generated across the ML model(s).

For example, assume the location information indicates the user 401 is located at a residential address (e.g., a home of the user 401). In this example, the client device 110 can cause the privacy search system 180 to process the location information, using classification model(s), to generate the output(s) (e.g., as described with respect to the location engine 141 of FIG. 1). The output(s) can include, for example, one or more types of an environment corresponding to the location information in which the user 401 is located when the search query 415B is received and/or a respective value associated with each of the one or more types of the environment. The one or more types of the environment can be defined with varying levels of granularity. For example, the one or more types of the environment can correspond to a public environment or a private environment, or more particularly, a coffee shop, a library, a train station, and/or other more specific types of public environments or a residential home (e.g., of the user of the client device 110), a personal office, and/or other more specific types of private environments. Further, the value associated with each of the one or more types of environments can be a probability, a log likelihood, a binary value, and/or any other value that indicates a confidence level associated with a classification of the type of the environment in which the user 401 is located when the search query 415B is received. By processing the location information using the privacy search system 180, the client device 110 can determine that the user 401 is at home, which can be considered a private environment.

Additionally, or alternatively, assume the audio data does not include speech of the user 401 or any other user (e.g., the other user 402), but captures audio data corresponding to a television show playing in the background of the environment 400. In this example, the client device 110 can cause the privacy search system 180 to process the audio data, using acoustic model(s), to generate the output(s) (e.g., as described with respect to the acoustic engine 142 of FIG. 1). The output(s) can include, for example, one or more acoustic properties captured in the audio data and/or a respective value associated with each of the one or more acoustic properties. The one or more acoustic properties can include, for example, a noise level of the environment 400 in which the user 401 is located when the search query 415B is received, one or more types of noises captured in the environment 400 in which the user 401 is located when the search query 415B is received, and/or a respective value associated with each of the one or more types of noises. Further, the value associated with each of the one or more types of environments can be a probability, a log likelihood, a binary value, and/or any other value that indicates a confidence level associated with a classification of the types of noises captured in the environment 400 in which the user 401 is located when the search query 415B is received. By additionally or alternatively processing the audio data using the privacy search system 180, the client device 110 can determine that the audio data does not include speech of the user 401 or any other user, but that the audio data captures the television show playing in the background of the environment 400.

Additionally, or alternatively, assume the vision data does not capture any other user (e.g., the other user 402) in the environment, but a couch is present in the environment 400. In this example, the client device 110 can cause the privacy search system 180 to process the vision data, using vision model(s), to generate the output(s) (e.g., as described with respect to the vision engine 143 of FIG. 1). The output(s) can include, for example, one or more acoustic properties captured in the audio data and/or a respective value associated with each of the one or more acoustic properties. The one or more acoustic properties can include, for example, an indication of whether other users (e.g., the other user 402) are present in the environment 400 in which the user 401 is located when the search query 415B is received (and optionally an identify of the other user(s) if visual embeddings of the other user(s) are available), one or more types of objects captured in the environment 400 in which the user 401 is located when the search query 415B is received, and/or a respective value associated with each of the one or more types of objects. Further, the value associated with each of the one or more types of environments can be a probability, a log likelihood, a binary value, and/or any other value that indicates a confidence level associated with a classification of the types of objects captured in the environment 400 in which the user 401 is located when the search query 415B is received. By additionally or alternatively processing the vision data using the privacy search system 180, the client device 110 can determine that the vision data does not indicate any other user is present in the environment, but that the vision data captures the couch in the environment 400.

Further, the client device 110 can cause the privacy search system 180 to process one or more of these outputs that are generated based one processing one or more of the location information, the audio data, or the vision data to generate the privacy measure associated with the submission of the search query 415B. The one or more of these outputs can be processed using ML model(s) or rule(s) (e.g., ML rule(s) and/or heuristically defined rule(s)). For example, based on the user 401 being present in the environment 400 corresponding to the home of the user 401 as indicated by the location information, the noise level of the environment 400 being relatively low (e.g., the television show in the background) and other users not being present in the environment 400 as indicated by the audio data, and/or and other users not being present in the environment 400 as indicated by the vision data, the resulting privacy measure associated with the submission of the search query 415B may indicate that the user 401 regards the search query 415B as private. Accordingly, the resulting privacy measure can be a label of "private", and may optionally include an associated value that is indicative of a private environment (e.g., a probability of 0.95 associated with the label of "private"). This resulting privacy measure can be subsequently utilized to determine whether the search query 415B should be included in a subset of historical search queries presented to the user 401 when additional user input directed to the search interface is received at the client device 110 or an additional client device of the user 401.

In various implementations, additional user input directed to the search interface displayed on the graphical user interface 190 can be received from the user 401 of the client device 110. For example, and as shown in FIG. 4C, assume the user 401 subsequently provides additional user input to access the search interface (e.g., the browser-based software application accessible by the client device 110 as indicated by the URL 411 of "www.exampleurl0.com/"). When the search interface is subsequently accessed at the client device 110, at least a subset of historical search queries can be presented to the user 401 at the search interface of the client device 110. The subset of the historical search queries presented to the user 401 can be selected from a superset of historical search queries based on the privacy measure associated with the submission of the search query 415B and an additional privacy measure associated with receiving of the additional user input directed to the search interface (e.g., the user accessing the search interface as noted above). The additional privacy measure can be generated in the same or similar manner described above with respect to the privacy measure, but based on one or more additional environmental signals that are obtained at the time the additional user input directed to the search interface is received in the environment 400.

For example, assume the user 401 is present in the environment 400 described with respect to FIGS. 4A and 4B (e.g., the user 401 is alone in the environment 400), but at a subsequent time, such as the next day, the next week, and/or any other time that is subsequent to a time when the search query 415B is received). In this example, the additional privacy measure associated with the additional user input directed to the search interface likely matches the privacy measure associated with the submission of the search query 415B. As a result, the subset of the historical search queries that are presented to the user 401 (e.g., 425C1, 425C2, 425C3, and 425C4) may include the search query 415B. In some implementations, the subset of the historical search queries that are presented to the user 401 can be presented as a list or search queries 425 that includes the search query 415B (e.g., as indicated by 425C1) and/or other search queries associated with privacy measures that at least match the privacy measure associated with the submission of the search query 415B. In some implementations, the list of search queries 435 can optionally include additional search queries that do not belong to the superset of the historical search queries from which the subset is selected. For example, the list of search queries 425 can optionally include one or more popular search queries (e.g., as indicated by 425C5) that are popular across a population of users at the subsequent time when the additional user input directed to the search interface is received. In some additional or alternative implementations, the list of search queries 425 can optionally include a selectable element 425C6 that, when selected, causes one or more additional historical search queries to be presented to the user 401. For example, the list of search queries 425 can be expanded to include one or more of the additional historical search queries, or an additional subset of the historical search queries can supplant those included in the list of search queries 425. In some additional or alternative implementations, the subset of the historical search queries can be utilized to generate one or more autocomplete suggestions for a partial query being entered by the user 401 at the search interface. For example, assume the user 401 provides a partial query 415C of "Sym" via the virtual keyboard 196. In this example, the search query 415B can be utilized to generate an autocomplete suggestion 415C1 of "ptoms of Infectious Disease #19". Further assume that the autocomplete suggestion 415C1 is selected by the user 401. In this example, an additional instance of the search query 415B can be resubmitted, and search results that are responsive to the additional instance of the search query 415B can be presented to the user 401.

Figure 5A:
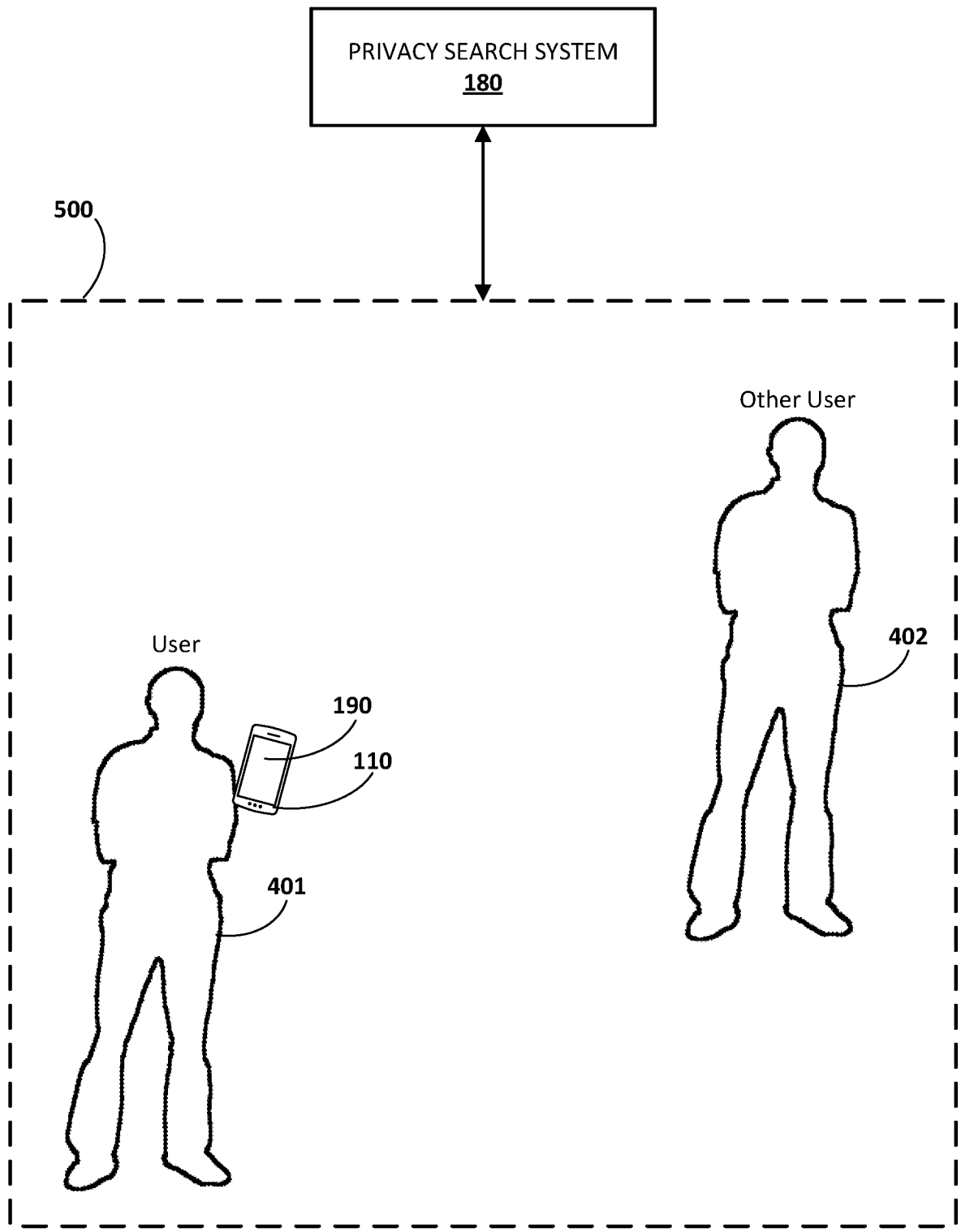
FIGS. 5A and 5B depict various non-limiting examples of user interfaces associated with generating a privacy measure associated with submission of a search query in a public environment and providing a subset of historical search queries based on the generated privacy measure, in accordance with various implementations.
Figure 5B:
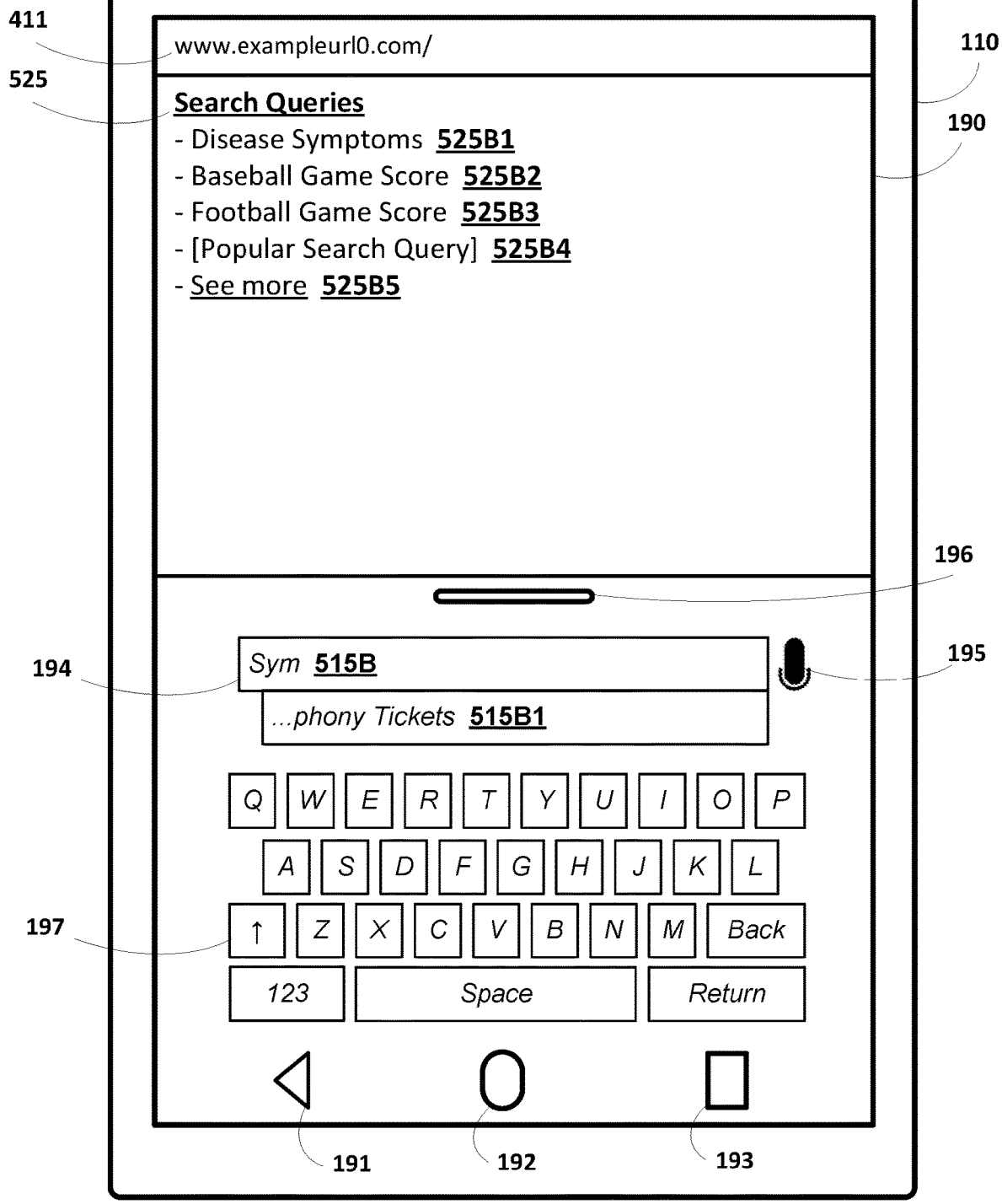

In contrast, assume the user 401 is present in an environment that is distinct from the environment 400 when the additional user input directed to the search interface is received, such as an environment 500 depicted in FIG. 5A. As shown in FIG. 5A, assume the user 401 is co-present in the environment 500 with the other user 402 as indicated by the other user 402 being located inside of the environment 500 (e.g., inside the dashed box). Further assume, and as shown in FIG. 5B, the additional user input directed to the search interface (e.g., the browser-based software application accessible by the client device 110 as indicated by the URL 411 of "www.exampleurl0.com/") includes the user 401 accessing the search interface. When the search interface is subsequently accessed at the client device 110, at least a subset of historical search queries can be presented to the user 401 at the search interface of the client device 110. The subset of the historical search queries presented to the user 401 can be selected from a superset of historical search queries based on the privacy measure associated with the submission of the search query 415B and an additional privacy measure associated with receiving of the additional user input directed to the search interface (e.g., the user accessing the search interface as noted above). The additional privacy measure can be generated in the same or similar manner described above with respect to the privacy measure, but based on one or more additional environmental signals that are obtained at the time the additional user input directed to the search interface is received in the environment 500.

For example, assume the user 401 is present in the environment 500 along with the other user 401, but at a subsequent time, such as the next day, the next week, and/or any other time that is subsequent to a time when the search query 415B is received). Further assume the location information captured at the subsequent time when the additional user input is received indicates the user in located at a restaurant (e.g., a public environment), the audio data captures a relatively high noise level caused by persons conversing in the restaurant, and/or the vision data indicates that other person(s) (e.g., at least the other user 402) is present in the environment 500. In this example, the resulting additional privacy measure associated with the additional user input directed to the search interface is unlikely to match the privacy measure associated with the submission of the search query 415B. As a result, the subset of the historical search queries that are presented to the user 401 (e.g., 525B1, 525B2, and 525B3) may exclude the search query 415B. In some implementations, the subset of the historical search queries that are presented to the user 401 can be presented as a list or search queries 525 that excludes the search query 415B (e.g., as indicated by lack of the search query 415B in the list of search queries 525) and/or includes other search queries associated with privacy measures that were previously submitted in public environments. In some implementations, the list of search queries 525 can optionally include additional search queries that do not belong to the superset of the historical search queries from which the subset is selected. For example, the list of search queries 525 can optionally include one or more popular search queries (e.g., as indicated by 525B4) that are popular across a population of users at the subsequent time when the additional user input directed to the search interface is received.

In some additional or alternative implementations, the list of search queries 525 can optionally include a selectable element 525B5 that, when selected, causes one or more additional historical search queries to be presented to the user 401. The selectable element 525B5 can optionally include an indication that the historical search queries presented to the user 401 in the list of search queries 525 have been filtered or restricted based on the environment 500. For example, the list of search queries 425 can be expanded to include one or more of the additional historical search queries, or an additional subset of the historical search queries can supplant those included in the list of search queries 425. Notably, the one or more additional search queries that are presented to the user 401 in response to a selection of the selectable element 525B5 may optionally include one or more historical search queries that were submitted in more private environments (e.g., the search query 415B). As another example, and in response to a selection of the selectable element 525B5, the user 401 may be prompted to solicit a user selection as to whether or not the user 401 would like the private search system 180 to filter or restrict presentation of search queries included the list of search queries 525 in response to subsequent user input directed to the search interface. In some additional or alternative implementations, the subset of the historical search queries can be utilized to generate one or more autocomplete suggestions for a partial query being entered by the user 401 at the search interface as described above with respect to FIG. 4C. However, since the environment 500 in which the user 401 is currently located does not match the environment 400 in which the search query 415B was originally received, the search query 415B may not be utilized to generate the autocomplete suggestions. For example, assume the user 401 provides a partial query 515C of "Sym" via the virtual keyboard 196. In this example, other search queries can be utilized to generate an autocomplete suggestion 515B1 of "phony Tickets".

Moreover, the privacy measure associated with the submission of the search query 415B can be modified based on an environment in which the user 401 is located when an additional instance of the search query 415B is received. For example, assume the user 401 submits the additional instance of the query 415B while present in the environment 500 depicted in FIG. 5A. In this example, the privacy measure associated with the submission of the search query 415B can be modified to indicate that the user may not regard the search query 415B as a private search query. As a result, if the user 401 provides further additional user input directed to the search interface in the environment 500, then the search query 415B may be included in the subset of the historical search queries presented to the user 401 in the same or similar manner described above with respect to FIG. 4C.

Although FIGS. 4A-4C and 5A-5B are described herein with respect to particular environmental signals being obtained in particular environments, it should be understood those are provided for the sake of example and are not meant to be limiting. Further, it should be understood that the techniques described herein can be implemented using any of the environmental signals alone, or any combination of the environmental signals described herein, and the environmental signals obtained by the client device 110 may be based on sensor(s) of the client device 110. Put another way, some client devices may not include GPS sensor(s), microphone(s), and/or vision component(s). However, the techniques described herein can still be utilized to adapt presentation of historical search queries presented to the user as long as at least one of the environmental signals can be obtained by the client device 110.

Figure 6:
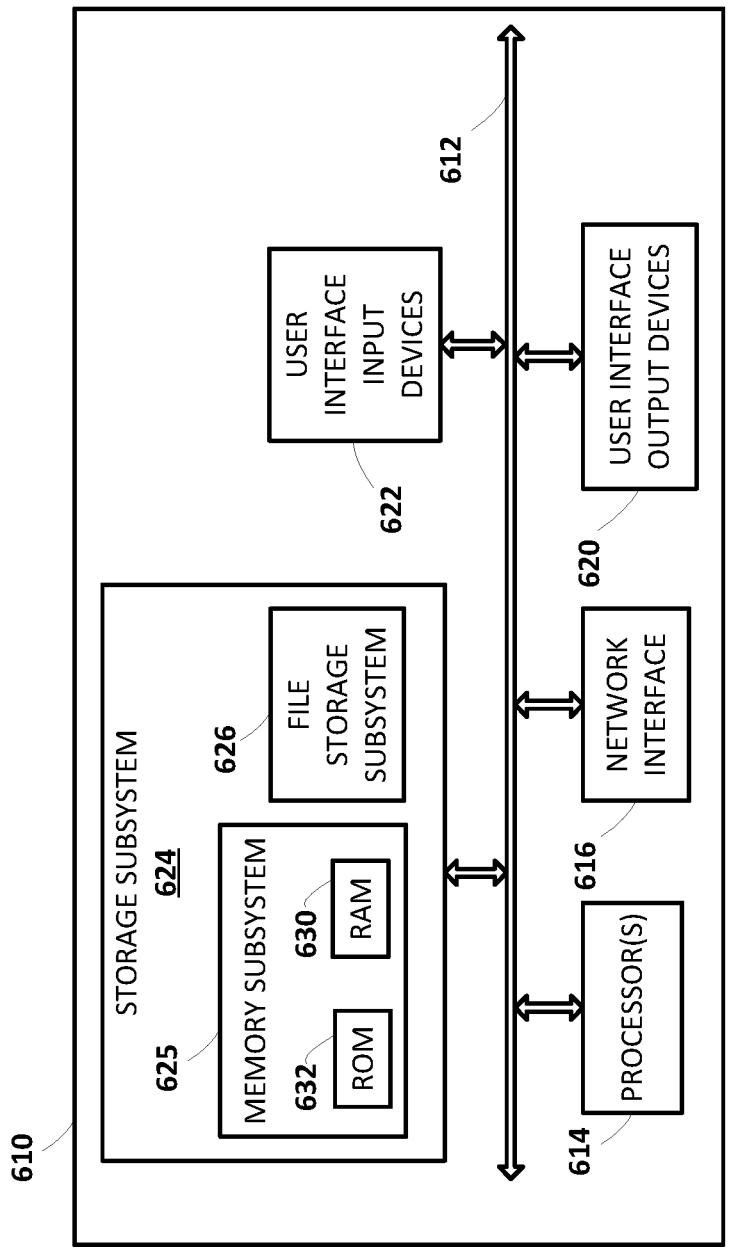
FIG. 6 depicts an example architecture of a computing device, in accordance with various implementations.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, via a client device of a user, a search query; obtaining one or more environmental signals associated with an environment in which the user is located at a time when the search query is received; processing the one or more environmental signals to generate a privacy measure associated with submission of the search query; and subsequent to generating the privacy measure associated with the submission of the search query: receiving user input directed to a search interface of the client device or an additional client device of the user; obtaining one or more additional environmental signals associated with the environment in which the user is located at a subsequent time when the user input is received, the subsequent time being subsequent to the time; processing the one or more additional environmental signals to generate an additional privacy measure associated with the user input; selecting, from a superset of historical search queries of the user, a subset of the historical search queries, the selecting being based on at least the privacy measure and the additional privacy measure; and in response to receiving the user input directed to the search interface, causing the subset of the historical search queries to be presented to the user via the client device or the additional client device.

These and other implementations of technology disclosed herein can optionally include one or more of the following features.

In some implementations, the one or more environmental signals associated with the environment of the user may include one or more of: location information that corresponds to a location of the user when the search query is received, audio data that captures environmental noise of the environment when the search query is received, or vision data that captures the environment when the search query is received.

In some versions of those implementations, the one or more environmental signals associated with the search query may include at least the location information that corresponds to the location of the user when the search query is received. In some further versions of those implementations, processing the one or more environmental signals to generate the privacy measure associated with the submission of the search query may include processing, using a machine learning model, the location information that corresponds to the location of the user when the search query is received to generate output associated with one or more types of the environment. Generating the privacy measure associated with the submission of the search query may be based on the output associated with one or more of the types of the environment. In yet further versions of those implementations, the type of the environment may include one or more of: a public environment, a semi-public environment, or a private environment.

In additional or alternative versions of those implementations, the one or more environmental signals associated with the search query may include at least the audio data that captures the environmental noise of the environment when the search query is received. In some further versions of those implementations, processing the one or more environmental signals to generate the privacy measure associated with the submission of the search query may include processing, using a machine learning model, the audio data that captures environmental noise of the environment when the search query is received to generate output associated with one or more acoustic properties of the environment. Generating the privacy measure associated with the submission of the search query may additionally or alternatively be based on the output associated with the one or more acoustic properties of the environment. In yet further versions of those implementations, the one or more acoustic properties of the environment may include one or more of: a noise level of the environment, or a classification of ambient noise detected in the environment.

In additional or alternative versions of those implementations, the one or more environmental signals associated with the search query may include at least the vision data that captures the environment when the search query is received. In some further versions of those implementations, processing the one or more environmental signals to generate the privacy measure associated with the submission of the search query may include processing, using a machine learning model, the vision data that captures the environment when the search query is received to generate output associated with one or more visual properties of the environment. Generating the privacy measure associated with the submission of the search query may additionally or alternatively be based on the one or more visual properties of the environment. In yet further versions of those implementations, the one or more visual properties of the environment may include one or more of: an indication of whether one or more additional users are present in the environment, or an indication of one or more objects that are present in the environment.

In some implementations, the method may further include: comparing the privacy measure associated with the submission of the search query and the additional privacy measure associated with the user input directed to the search interface; and determining, based on the comparing, whether the additional privacy measure associated with the user input directed to the search interface matches the privacy measure associated with the submission of the search query.

In some versions of those implementations, selecting the subset of the historical search queries may be in response to determining that the additional privacy measure associated with the user input directed to the search interface does not match the privacy measure associated with the submission of the search query. In some further versions of those implementations, determining that the additional privacy measure associated with the user input directed to the search interface does not match the measure associated with the submission of the search query may include determining the additional privacy measure associated with the user input fails to satisfy a threshold privacy measure level for the privacy measure associated with the submission of the search query.

In additional or alternative versions of those implementations, the method may further include causing a selectable element to be presented along with the subset of the historical search queries. The selectable element, when selected, may cause one or more additional historical search queries that were not selected for inclusion in the subset to be presented to the user via the client device or the additional client device.

In some implementations, the method may further include generating, based on the privacy measure associated with the submission of the search query, a prompt to solicit a user selection associated with whether the search query should be included in the subset; and causing the prompt to be presented to the user via the client device or the additional client device. In some versions of those implementations, causing the prompt to be presented to the user may be in response to determining a current privacy measure associated with the environment in which the user is located at an intermediate time, wherein the intermediate time is subsequent to the time and prior to the subsequent time.

In some implementations, the method may further include receiving additional user input to clear the subset of the historical search queries from the superset of historical search queries; and in response to receiving the additional user input, causing the historical search queries included in the subset to be removed from the superset.

In some implementations, the subset of the historical search queries may be presented to the user as autocomplete query suggestions for an additional search query being entered in response to receiving the user input directed to the search interface.

In some implementations, the subset of the historical search queries may be presented to the user as query suggestions for an additional search query to be entered at the search interface.

In some implementations, processing the one or more environmental signals to generate the privacy measure associated with the submission of the search query may include processing the one or more environmental signals using a machine learning model. Processing the one or more additional environmental signals to generate the additional privacy measure associated with the user input may include processing the one or more additional environmental signals using the machine learning model. In some versions of those implementations, the method may further include, prior to receiving the search query: obtaining a plurality of training instances, each of the plurality of training instances including training instance input and training instance output, the training instance input including one or more training environmental signals associated with a training search query, and the training instance output including one or more ground truth labels associated with a privacy level for the training search query. The method may further include training the machine learning model based on the plurality of training instances.

In some implementations, the method may further include processing the search query to identify one or more terms of the search query. Generating the privacy measure associated with the submission of the search query may be further based on processing one or more of the terms of the search query. In some versions of those implementations, processing one or more of the terms of the search query may include processing, using a machine learning model, one or more of the terms of the search query to generate output associated with one or more types of search queries. Generating the privacy measure associated with the submission of the search query may be based on the output associated with one or more of the types of search queries.

In some implementations, a method implemented by one or more processors is provided, and includes receiving, via a client device of a user, a search query; processing a set of environmental signals associated with an environment in which the user is located at a time when the search query is received to generate a privacy measure associated with submission of the search query; and subsequent to generating the privacy measure associated with the submission of the search query: receiving user input directed to a search interface of the client device or an additional client device of the user; processing an additional set of additional environmental signals associated with the environment in which the user is located at a subsequent time when the user input is received to generate an additional privacy measure associated with the user input, the subsequent time being subsequent to the time; in response to receiving the user input directed to the search interface, causing restricted historical search queries to be presented via the client device or the additional client device based on the privacy measure and the additional privacy measure, the restricted historical search queries being restricted based on the privacy measure and the additional privacy measure; receiving, via the client device or the additional client device, an additional search query, the additional search query being an additional instance of the search query; and processing a further additional set of environmental signals associated with the environment in which the user is located at a further subsequent time when the additional search query is received to modify the privacy measure associated with the submission of the search query, the further subsequent time being subsequent to the time and the subsequent time.

These and other implementations of technology disclosed herein can optionally include one or more of the following features.

In some implementations, the method may further include subsequent to modifying the privacy measure associated with the submission of the search query: receiving further user input directed to the search interface of the client device or the additional client device; processing a yet further set of additional environmental signals associated with the environment in which the user is located at a yet further subsequent time when the further user input is received to generate a further additional privacy measure associated with the user input, the yet further subsequent time being subsequent to the time, the subsequent time, and the further subsequent time; and in response to receiving the further user input directed to the search interface, causing unrestricted historical search queries to be presented via the client device or the additional client device, the unrestricted historical search queries being unrestricted based on the further additional privacy measure.

In some versions of those implementations, the restricted historical search queries may not include the search query, and the unrestricted historical search queries may include at least the search query.

These and other implementations of technology disclosed herein can optionally include one or more of the following features.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
receiving, via a search interface of a client device of a user, typed user input that includes a search query;
obtaining one or more environmental signals associated with an environment in which the user is located at a time when the search query is received,
wherein the one or more environmental signals associated with the environment in which the user is located at the time when the search query is received includes at least audio data that captures environmental noise of the environment when the search query is received, and
wherein the audio data that captures the environmental noise of the environment when the search query is received does not include speech of the user;
processing the one or more environmental signals to generate a privacy measure associated with submission of the search query,
wherein processing the one or more environmental signals to generate the privacy measure associated with submission of the search query comprises processing at least the audio data that captures the environmental noise of the environment when the search query is received to generate the privacy measure; and
subsequent to generating the privacy measure associated with the submission of the search query:
receiving, via the search interface of the client device or an additional search interface of an additional client device of the user, additional typed user input that includes a partial search query;
obtaining one or more additional environmental signals associated with the environment in which the user is located at a subsequent time when the partial search query is received,
wherein the subsequent time is subsequent to the time, wherein the one or more additional environmental signals associated with the environment in which the user is located at the subsequent time when the partial search query is received includes at least additional audio data that captures additional environmental noise of the environment when the partial search query is received, and
wherein the additional audio data that captures the additional environmental noise of the environment when the partial search query is received does not include speech of the user;
processing the one or more additional environmental signals to generate an additional privacy measure associated with the partial search query,
wherein processing the one or more additional environmental signals to generate the additional privacy measure associated with the partial search query comprises processing at least the additional audio data that captures the additional environmental noise of the environment when the partial search query is received;
selecting, from a superset of historical search queries of the user, a subset of the historical search queries,
wherein the selecting is based on at least the privacy measure and the additional privacy measure, and wherein the subset of the historical search queries includes at least one search query; and
in response to receiving the partial search query directed to the search interface or the additional search interface, causing the subset of the historical search queries to be presented to the user as autocomplete query suggestions for the partial search query via the client device or the additional client device.

2. The method of claim 1, wherein the one or more environmental signals associated with the environment of the user further include one or more of: location information that corresponds to a location of the user when the search query is received, or vision data that captures the environment when the search query is received.

3. The method of claim 2, wherein the one or more environmental signals associated with the search query further include at least the location information that corresponds to the location of the user when the search query is received.

4. The method of claim 3, wherein processing the one or more environmental signals to generate the privacy measure associated with the submission of the search query further comprises:
processing, using a machine learning model, the location information that corresponds to the location of the user when the search query is received to generate output associated with one or more types of the environment,
wherein generating the privacy measure associated with the submission of the search query is based on at least the output associated with one or more of the types of the environment.

5. The method of claim 4, wherein the type of the environment includes one or more of: a public environment, a semi-public environment, or a private environment.

6. The method of claim 1, wherein processing at least the audio data that captures the environmental noise of the environment when the search query is received comprises:
processing, using a machine learning model, the audio data that captures environmental noise of the environment when the search query is received to generate output associated with one or more acoustic properties of the environment,
wherein generating the privacy measure associated with the submission of the search query is based on the output associated with the one or more acoustic properties of the environment.

7. The method of claim 6, wherein the one or more acoustic properties of the environment include one or more of: a noise level of the environment, or a classification of ambient noise detected in the environment.

8. The method of claim 2, wherein the one or more environmental signals associated with the search query further include at least the vision data that captures the environment when the search query is received.

9. The method of claim 8, wherein processing the one or more environmental signals to generate the privacy measure associated with the submission of the search query further comprises:
processing, using a machine learning model, the vision data that captures the environment when the search query is received to generate output associated with one or more visual properties of the environment,
wherein generating the privacy measure associated with the submission of the search query is based on at least the one or more visual properties of the environment.

10. The method of claim 9, wherein the one or more visual properties of the environment include one or more of: an indication of whether one or more additional users are present in the environment, or an indication of one or more objects that are present in the environment.

11. The method of claim 1, further comprising:
comparing the privacy measure associated with the submission of the search query and the additional privacy measure associated with the partial search query directed to the search interface or the additional search interface; and
determining, based on the comparing, whether the additional privacy measure associated with the partial search query directed to the search interface matches the privacy measure associated with the submission of the search query.

12. The method of claim 11, wherein selecting the subset of the historical search queries is in response to determining that the additional privacy measure associated with the partial search query directed to the search interface or the additional search interface does not match the privacy measure associated with the submission of the search query.

13. The method of claim 12, wherein determining that the additional privacy measure associated with the partial search query directed to the search interface or the additional search interface does not match the measure associated with the submission of the search query comprises determining the additional privacy measure associated with the partial search query fails to satisfy a threshold privacy measure level for the privacy measure associated with the submission of the search query.

14. The method of claim 11, further comprising:
causing a selectable element to be presented along with the subset of the historical search queries, wherein the selectable element, when selected, causes one or more additional historical search queries that were not selected for inclusion in the subset to be presented to the user as the autocomplete query suggestions for the partial search query via the client device or the additional client device.

15. The method of claim 1, further comprising:
generating, based on the privacy measure associated with the submission of the search query, a prompt to solicit a user selection associated with whether the search query should be included in the subset; and
causing the prompt to be presented to the user via the client device or the additional client device.

16. A method implemented by one or more processors, the method comprising:
receiving, via a search interface of a client device of a user, typed user input that includes a search query;
processing a set of environmental signals associated with an environment in which the user is located at a time when the search query is received to generate a privacy measure associated with submission of the search query,
wherein the set of environmental signals associated with the environment in which the user is located at the time when the search query is received includes at least audio data that captures environmental noise of the environment when the search query is received,
wherein processing the set of environmental signals associated with the environment in which the user is located at the time when the search query is received to generate the privacy measure associated with submission of the search query comprises processing at least the audio data that captures the environmental noise of the environment when the search query is received to generate the privacy measure, and
wherein the audio data that captures the environmental noise of the environment when the search query is received does not include speech of the user; and
subsequent to generating the privacy measure associated with the submission of the search query:
receiving, via the search interface of the client device or an additional search interface of an additional client device of the user, additional typed user input that includes a partial search;
processing an additional set of additional environmental signals associated with the environment in which the user is located at a subsequent time when the partial search query is received to generate an additional privacy measure associated with the partial search query, wherein the subsequent time is subsequent to the time,
wherein the additional set of environmental signals associated with the environment in which the user is located at the subsequent time when the partial search query is received includes at least additional audio data that captures additional environmental noise of the environment when the user input is received,
wherein processing the additional set of environmental signals associated with the environment in which the user is located at the time when the partial search query is received to generate the additional privacy measure associated with the user input comprises processing at least the additional audio data that captures the additional environmental noise of the environment when the partial search query is received to generate the additional measure, and
wherein the additional audio data that captures the additional environmental noise of the environment when the partial search query is received does not include speech of the user;
in response to receiving the partial search query directed to the search interface or the additional search interface, causing restricted historical search queries to be presented as autocomplete query suggestions for the user input via the client device or the additional client device based on the privacy measure and the additional privacy measure,
wherein the restricted historical search queries are restricted based on the privacy measure and the additional privacy measure, and
wherein the restricted historical search queries do not include the search query;
receiving, via the search interface of the client device or the additional search interface of the additional client device, further additional typed input that includes an additional search query,
wherein the additional search query is an additional instance of the search query; and
processing a further additional set of environmental signals associated with the environment in which the user is located at a further subsequent time when the additional search query is received to modify the privacy measure associated with the submission of the search query,
wherein the further subsequent time is subsequent to the time and the subsequent time, and
wherein the further additional set of environmental signals associated with the environment in which the user is located at the further subsequent time when additional search query is received includes at least further additional audio data that captures further additional environmental noise of the environment when the additional search query is received.

17. The method of claim 16, further comprising:
subsequent to modifying the privacy measure associated with the submission of the search query:
  receiving, via the search interface of the client device or the additional search interface of the additional client device of the user, yet further additional typed user input that includes an additional partial query;
  processing a yet further set of additional environmental signals associated with the environment in which the user is located at a yet further subsequent time when the additional partial query is received to generate a further additional privacy measure associated with the additional partial query,
    wherein the yet further subsequent time is subsequent to the time, the subsequent time, and the further subsequent time; and
  in response to receiving the additional partial query directed to the search interface or the additional search interface, causing unrestricted historical search queries to be presented as further autocomplete query suggestions for the additional partial query via the client device or the additional client device,
    wherein the unrestricted historical search queries are unrestricted based on the further additional privacy measure, and
    wherein the unrestricted historical search queries include at least the search query.

18. A system comprising:
at least one processor; and
at least one memory storing instructions that, when executed, cause the at least one processor to:
  receive, via a search interface of a client device of a user, typed user input that includes a search query;
  obtain one or more environmental signals associated with an environment in which the user is located at a time when the search query is received,
    wherein the one or more environmental signals associated with the environment in which the user is located at the time when the search query is received includes at least audio data that captures environmental noise of the environment when the search query is received;
  process the one or more environmental signals to generate a privacy measure associated with submission of the search query,
    wherein the instructions to process the one or more environmental signals to generate the privacy measure associated with submission of the search query comprise instructions to process at least the audio data that captures the environmental noise of the environment when the search query is received to generate the privacy measure; and
  subsequent to generating the privacy measure associated with the submission of the search query:
    receive, via the search interface of the client device or an additional search interface of an additional client device of the user, additional typed user input that includes a partial search query;
    obtain one or more additional environmental signals associated with the environment in which the user is located at a subsequent time when the partial search query is received,
      wherein the subsequent time is subsequent to the time, and
      wherein the one or more additional environmental signals associated with the environment in which the user is located at the subsequent time when the partial search query is received includes at least additional audio data that captures additional environmental noise of the environment when the partial search query is received;
    process the one or more additional environmental signals to generate an additional privacy measure associated with the partial search query,
      wherein the instructions to process the one or more additional environmental signals to generate the additional privacy measure associated with the partial search query comprise instructions to process at least the additional audio data that captures the additional environmental noise of the environment when the partial search query is received;
    select, from a superset of historical search queries of the user, a subset of the historical search queries,
      wherein the selecting is based on at least the privacy measure and the additional privacy measure, and
      wherein the subset of the historical search queries includes at least one search query; and
    in response to receiving the partial search query directed to the search interface or the additional search interface, cause the subset of the historical search queries to be presented to the user as autocomplete query suggestions for the partial search query via the client device or the additional client device.

* * * * *